United States Patent [19]
Hoffman et al.

[11] Patent Number: 5,183,998
[45] Date of Patent: Feb. 2, 1993

[54] APPARATUS AND METHOD FOR HEATING WATER FOR INFUSION AND THE LIKE

[75] Inventors: Ronald J. Hoffman, Solon; Lawrence M. Pillion, University Heig; Paul L. Jewell, Northfield Cent, all of Ohio

[73] Assignee: Mr. Coffee Inc.

[21] Appl. No.: 529,900

[22] Filed: May 30, 1990

[51] Int. Cl.$^5$ ............................................. H05B 1/02
[52] U.S. Cl. ........................... 219/492; 219/497; 219/501; 219/508; 219/506; 392/478; 392/485; 99/281; 99/285
[58] Field of Search ............... 219/491, 492, 497, 499, 219/501, 505, 506, 508, 441, 439, 452, 494; 392/478, 485; 99/279, 281, 285

[56] References Cited

U.S. PATENT DOCUMENTS

| | | | |
|---|---|---|---|
| 3,423,209 | 1/1969 | Weber | 99/71 |
| 3,552,298 | 1/1971 | Bufkin | 99/281 |
| 3,693,535 | 9/1972 | Abel, Jr. | 99/282 |
| 3,987,717 | 10/1976 | Bergmann et al. | 99/280 |
| 4,008,656 | 2/1977 | Gruner | 99/298 |
| 4,086,466 | 4/1978 | Scharlack | 219/501 |
| 4,191,100 | 3/1980 | Marotta | 99/299 |
| 4,302,662 | 11/1981 | Kicherer et al. | 219/492 |
| 4,331,067 | 5/1982 | Mysicka et al. | 99/305 |
| 4,348,583 | 9/1982 | Bube et al. | 219/497 |
| 4,361,750 | 11/1982 | Miklas | 219/297 |
| 4,402,257 | 9/1983 | Marotta | 99/307 |
| 4,441,016 | 4/1984 | Oota et al. | 219/492 |
| 4,566,802 | 1/1986 | Koehler | 219/492 |
| 4,613,745 | 9/1986 | Marotta et al. | 219/297 |

FOREIGN PATENT DOCUMENTS 2653300 6/1978 Fed. Rep. of Germany.

*Primary Examiner*—Mark H. Paschall

[57] ABSTRACT

An automatic electric maker for coffee or the like, having user selectable AUTO, BREW, WARM or OFF modes. The temperature of the WARM mode is selectable by applying partial power to the heating element. Full power can be triggered using a phase controlled triggerable semiconductor. Monitoring devices measure temperature and time to control the operator of the apparatus and to detect malfunction. A temperature comparator is provided to determine if the water conduit should be cleaned and to determine if the BREW state of the machine should be converted to the WARM state, and to place the system in the OFF state if necessary.

55 Claims, 19 Drawing Sheets

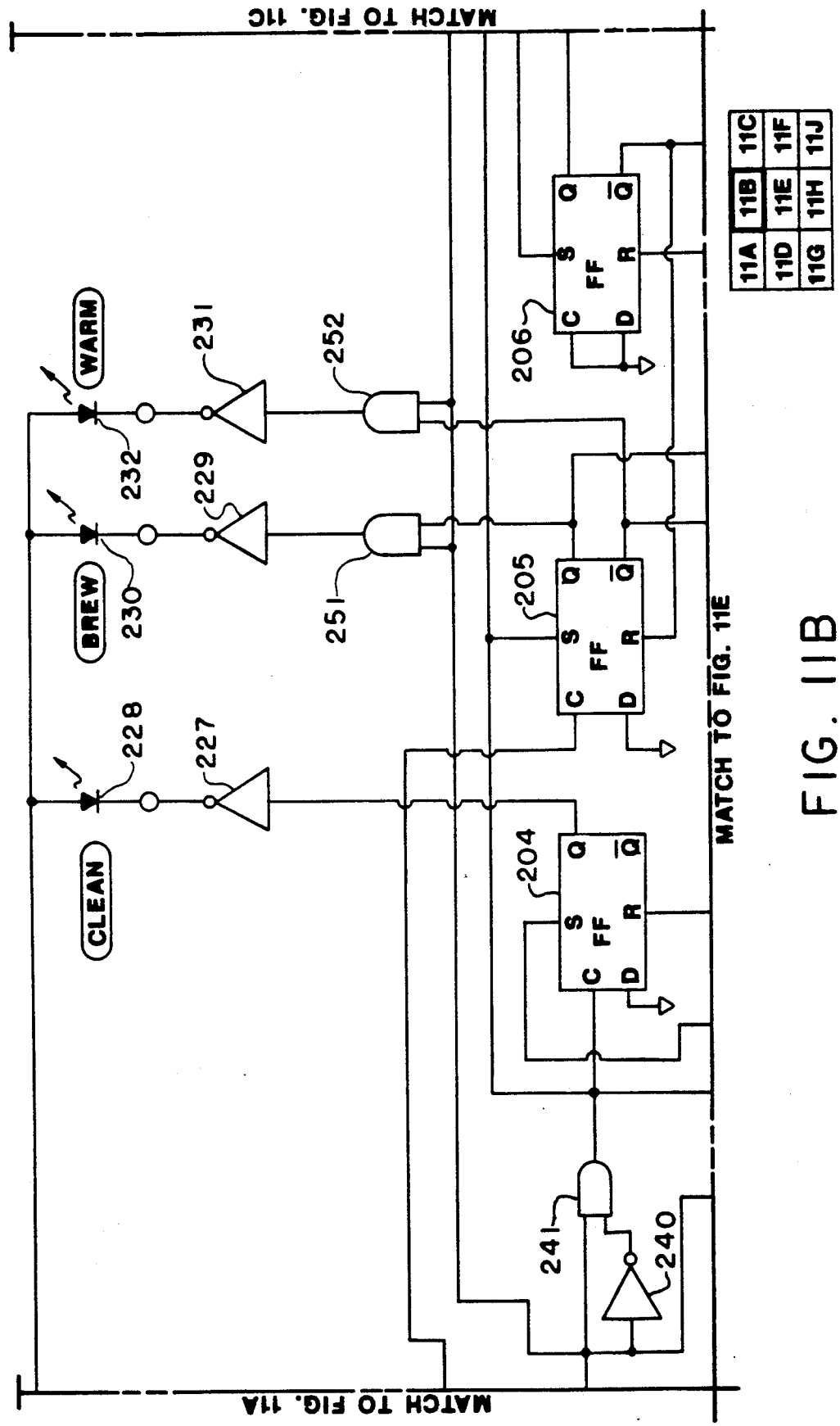

APPARATUS AND METHOD FOR HEATING WATER FOR INFUSION AND THE LIKE

TECHNICAL FIELD

The present invention generally relates to a system for heating a charge of water or other liquid and is particularly applicable to machines and systems heating water for infusion purposes, e.g., for brewing coffee or tea, and subsequently maintaining the heated charge or infused liquid at an elevated temperature, e.g., at a "warm" or "hot", drinking temperature. The invention is particularly useful in coffee makers or other apparatus for heating water for infusion purposes in which a cold or unheated water charge is contained in a reservoir and is heated and transferred to a second chamber (hot drink vessel) in which it is maintained at the elevated temperature. In addition, the present invention is particularly useful in systems utilizing a single heating means, such as a flow through heating unit, for heating water, or other liquid from the reservoir chamber, pumping the heated liquid to the second chamber, and maintaining the liquid in the second chamber at an elevated temperature while awaiting use. However, the concepts may be utilized in systems utilizing other types of heating units, or other arrangements.

Various systems are known for heating a charge of water contained in a reservoir chamber and effecting a transfer of heated water to a second chamber in which the liquid is maintained at an elevated temperature. Such systems are in common use to provide hot water for infusing coffee or tea. In such systems hot water flows through a coffee or tea infusion chamber during its transfer to the second chamber which may be a decanter or carafe. In known coffee makers, a flow-through heating and pumping unit is displaced from the reservoir, most often at or below the level of the bottom of the reservoir, and an outlet from the bottom of the reservoir is connected to the heating and pumping unit. The water flows, by gravity and siphon effect, through a check valve from the reservoir to the flow-through heating and pumping unit. In such a system, the water is heated as it flows through the heater and hot water is delivered from the outlet of the heater to a riser system through which it is pumped upwardly and discharged above the top of the infusion chamber or coffee basket. The pumping action is usually achieved by the cooperation of the check valve located below the cold water reservoir and the heating of the water in the heater unit. As the water heats up, it expands and vapor is generated. The unidirectional check valve keeps the hot water from flowing back into the cold water reservoir and thus the water is forced to flow into the infusion basket and then into the hot drink vessel.

In known systems, the heating unit operates continuously at full power while heating the water and transferring it. When the water has been substantially all transferred, the heat input to the heating unit is no longer dissipated by the water and the temperature of the heating unit rises causing a thermostat to cut off the power and to thereafter operate in an on/off duty cycle mode, to maintain the temperature of the heating means within a predetermined range for keeping the liquid warm. In some systems, once the water has been transferred and the thermostat has been activated, power is applied to the heating unit through resistors to lower the temperature of the heating unit. This method requires high wattage resistors and is wasteful of energy. In systems where the cold water is heated by a heater unit separate from the one for the warming operation, contacts for the main heater may be thermally held open during the warming operation so as to keep said heater deenergized during said operation.

One of the problems encountered in known systems when operating in the warming mode is the difficulty in achieving the appropriate level of heat energy to maintain the liquid in the vessel at the desired drinking temperature. This is achieved by the insertion of energy dissipating resistors in the heating circuits or, to avoid the use of resistors, by cycling on/off full power to the heating unit. In such systems, when the liquid in the vessel being maintained at an elevated temperature has been substantially dispensed therefrom, the temperature of the heating means builds to approximate the thermostat cut out temperature. While the cut out temperature may be set so that there is no fire hazard, a substantially dry vessel, such as a carafe in a coffee maker, may be ruined because of the drying and "burning on" of the residue. Furthermore, the on/off cycling will continue until the apparatus is turned off. If the equipment is left unattended, this condition may persist for long periods and irreparably damage the vessel. This condition is hard for the manufacturer to control because of habits of various users including that of using a non-original replacement vessel which may have different heat transmitting characteristics from the original.

The present invention improves the operation of the heating cycle and also eliminates the problem encountered in the warming phase by allowing the user to control the temperature of the heating unit and thus the temperature of the liquid in the vessel and also by automatically turning off the apparatus should an empty vessel be left on the heating unit.

In known types of water heating apparatus, overheat conditions may occur if the vessel is empty or the control thermostat or other portions of the system have failed. To avoid dangerous conditions and alleviate fire danger, various thermostat arrangements have been provided to cut off power under various overheat conditions. This requires additional thermostats and adds to cost and complexity. The present invention improves the control of excessive temperature by monitoring the heating unit temperature at all times and taking the appropriate action without relying on additional thermostats which add cost and complexity and reduce reliability. The present invention eliminates the use of thermostats altogether and monitors temperature by temperature sensing means which, in cooperation with ancillary logic, control the apparatus during the brewing and warm cycle and turn off the apparatus when the temperature and conditions require it.

A further problem which arises with a water heating apparatus is limestone or other type deposits in the water passages of the heating unit. For example, in a flow through heater where a water carrying tube is heated to heat the water, the deposits will build up and interfere with the heat transfer from the heater, through the tube wall, to the water. This can cause the thermostat to cycle on and off, extend the brewing time and make the coffee taste bitter. In such cases, the water passages should be cleaned. In one known type of coffee maker, the water level in the cold water chamber is sensed and this is used in conjunction with a condition indicative of the heater temperature, which increases during the water heating operation as deposits increase, to provide a visual indication to the user that cleaning of the water tubes is needed.

Because of deposits, coffee makers and other similar water heating apparatus of the type described should be periodically cleaned with a cleaning solution to remove deposits, but this is often neglected by the user. The present invention includes features for reminding the user of the need for cleaning and for facilitating the cleaning of the apparatus.

SUMMARY OF THE INVENTION

One object of the invention is to eliminate the shortcoming of known devices, where the warming mode can only be obtained by first going through the brewing mode. The present invention in its preferred form allows the user to select the operating mode, i.e., AUTO, BREW, WARM only, or OFF. The preferred embodiment allows the mode selection to be accomplished by using a single push-button switch.

Another object of the invention is to allow the user to adjust the warming temperature level and thus obtain the temperature desired by the user for the beverage.

A further object of the invention is to have a constant monitoring of the operating temperature of the device and to make the appropriate logic decisions depending on the then active operating mode.

An additional object of the invention is to detect the build up of lime deposits in the apparatus and to warn the user of the need to clean the machine. In conjunction with this warning, the apparatus has an operating mode which allows unattended cleaning of the machine.

A further object of the invention is to maintain a constant temperature in the WARM mode while eliminating the use of power dissipating resistors, or duty cycle control.

Another object of the invention is to eliminate the use of thermostatic switches in the operation of the apparatus and thus improve performance.

The preferred form of the present invention provides a new and improved hot beverage infusion or water heating machine or apparatus and a control system therefore, which machine and control system preferably operates to provide a machine having multiple states with signals indicating the state of the machine and conditions within the states. The apparatus is such that it can be operated from one state to another by operator intervention regardless of the existing state of the machine, and during a BREW and WARM cycle is operated between states and conditions within states in response to certain information including temperature, or elapsed time period(s) in relationship to predetermined factors. The information is determined or gathered automatically by the control system, with said system being further responsive to user input during a cycle to effect a change from one state to another or to automatically start a cycle in response to a user set or controlled inputs such as automatic start in response to a preset timer.

The present invention in its preferred form provides an apparatus for heating a water or liquid for infusion purposes in which the apparatus and related control system have an AUTO state which can be manually initiated. The AUTO state allows the state of the apparatus to then be changed by a manual input or by external means such as a computer, modem or other signal generating means or an internal or external user settable clock. The apparatus further provides a BREW state for heating the liquid for infusion purposes, said state being capable of activation either by operator input means or by externally generated change of state means such as a clock/timer. The apparatus further provides a WARM state and an OFF state, said states being capable of activation either by operator input or by internally operated change of state means determined by operational conditions or predetermined user selectable elapsed times.

In the BREW state, the apparatus has heating means for heating the liquid to the appropriate infusion temperature and sensing means for monitoring the heating means temperature. The sensing means, in conjunction with related control means, is capable of monitoring several apparatus malfunctions (such as non-operational heating unit, temperature sensor, thermal fuses, power control semiconductor, control circuitry, etc.), detecting lime deposit build up in the apparatus requiring that the apparatus be cleaned, alerting the operator of change of state by indicator means and sequentially changing the state from BREW to WARM to OFF by control means. The temperature sensing means further controls power delivery means by applying, during the BREW cycle, essentially full alternating current line voltage to the heating means.

In the WARM cycle, the apparatus includes operator adjustable temperature control means for controlling the temperature of the beverage, power control means for activating power delivery means at the appropriate time during each half alternating current cycle to achieve the user selected temperature, operator selectable timing means for changing the state of the apparatus from the WARM to the OFF state and means for changing the state of the apparatus if the temperature of the heating means exceeds a preset high temperature threshold due to lack of liquid in the vessel or any other condition causing an elevated temperature.

The invention in its preferred from further provides visual indicator means indicating the active state and the deposit build up condition of the apparatus. The apparatus may further provide an audible signal via signal generating means, to alert the operator at each change of state.

A further preferred feature of the invention is that it provides vessel detection means which disable the delivery of power to the heating means if the vessel is removed from the apparatus at any stage of the operating cycle.

More particularly the present invention in its preferred form provides, among others, the following distinctive features:

1) Use of partial power, preferably without on/off thermostatic controls, without use of power dissipating elements, and without rectifier elements, during the WARM mode. In the preferred embodiment, the power level may be adjustable and the application of partial power to the heating means is accomplished by using a phase controlled triggerable semiconductor which, through power control means, is caused to conduct for the appropriate portion of each half A.C. current cycle to achieve the desired temperature. The temperature of the infused liquid thus remains essentially constant since partial power is applied at the same frequency of the A.C. line (typically 50 or 60 HZ) and power is not wasted in power dissipating elements.

2) Use of full power during the BREW cycle by triggering the phase controlled triggerable semiconductor a fraction of a millisecond after each time the A.C.

voltage absolute value first exceeds zero volts. A further feature of the invention is the use of negative gate current to trigger the triggerable semiconductor.

3) Utilization of temperature sensing means operatively connected to the heating means to provide temperature information to the control system to cause all necessary state changes and further monitor malfunctions in the BREW state and overheat conditions in the WARM state. In the preferred embodiment, the temperature sensor is a thermistor which may be optimally connected to the heating means to optimally detect temperature variations of said heating means caused by lime deposit build up.

4) Monitoring of temperature during the BREW state to determine if the heating means exceed a specified temperature for a preset period of time due to lime deposits build up. If the condition occurs, clean indicator means are activated to alert the operator. Another feature is that the indicator means remains in its on state until another BREW cycle is initiated or the machine is unplugged from the A.C. source, but is not disabled when the machine reaches the OFF state.

5) Timer means activated when the BREW cycle is started, the timer means providing user selectable machine shut off times which will set the apparatus to the OFF state when the preset time has elapsed.

6) Temperature comparison means providing various temperature levels or ranges to which the control system responds: a first level or range is used by the control system when a BREW cycle is commenced to determine if the temperature sensing means is responding as it should, a higher second level or range is used in the course of the BREW state to determine if the system is in need of cleaning and to determine, if the BREW cycle has been completed, that partial power is to be turned on for the WARM state, and a third high level or range which, if exceeded or entered while in the BREW state, causes a switching from the BREW state to the WARM state and turns the heating power off until the temperature falls below the second level or range, at which time partial power is applied to achieve the desired temperature in the WARM state. The third high level additionally, depending on the state of the user selectable shut off means, can respond to conditioning signals established in the WARM state to shut down the system and preferably reset the control system to the OFF state if the temperature of the heating means again enters the high range.

7) User selectable states which allow operator to select any state without having to allow the normal completion of the prior state. This feature is particularly useful since it allows the operator to warm a drink without first going through the BREW cycle and also allows the user to fill the reservoir with an acidic cleaning fluid with the apparatus in the WARM mode or state. The heating and pumping action at the lower warming power level will thus take place at a much slower rate allowing the heated acid to fully dissolve the mineral deposits. In the preferred embodiment, once all of the acid has been pumped through the heater, the temperature will rise above the third high level and cause the machine to shut off automatically.

8) Vessel sensor means which detect the presence or absence of the beverage vessel from the apparatus and inhibits the application of power to the heating means.

Different apparatus utilizing subsets of the above features can be easily implemented by those skilled in the art.

DESCRIPTION OF THE DRAWINGS

The following description of a preferred embodiment of the invention is made with reference to the drawings which form a part of this specification for all subject matter discussed therein and in which:

FIGS. 11A-11J together are the electrical schematic for an embodiment of the device shown in FIGS. 5A and 5B.

DESCRIPTION OF PREFERRED EMBODIMENT

Figure 1:
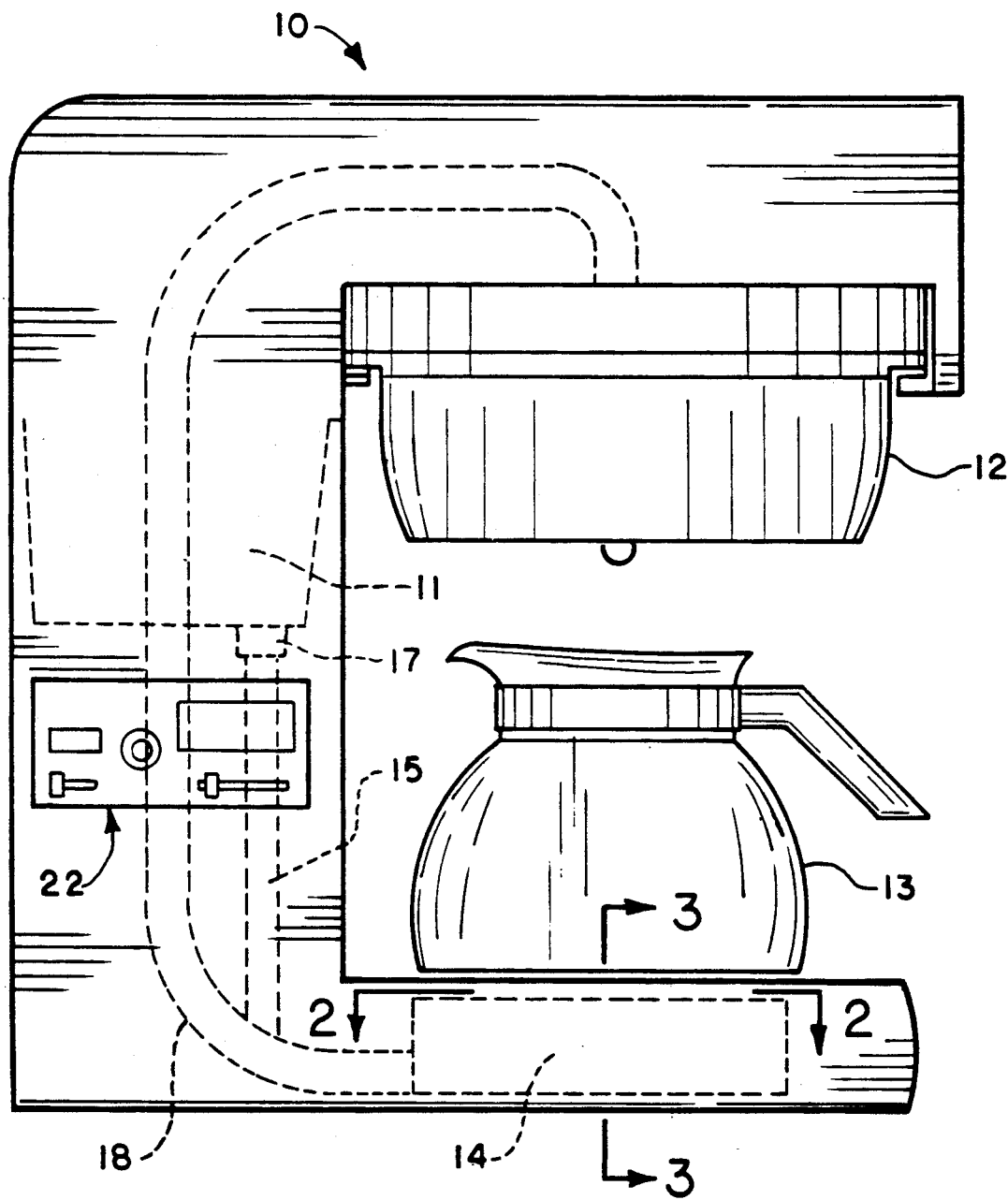
FIG. 1 is a simplified front elevational view of a coffee brewer embodying the present invention.
Figure 2:
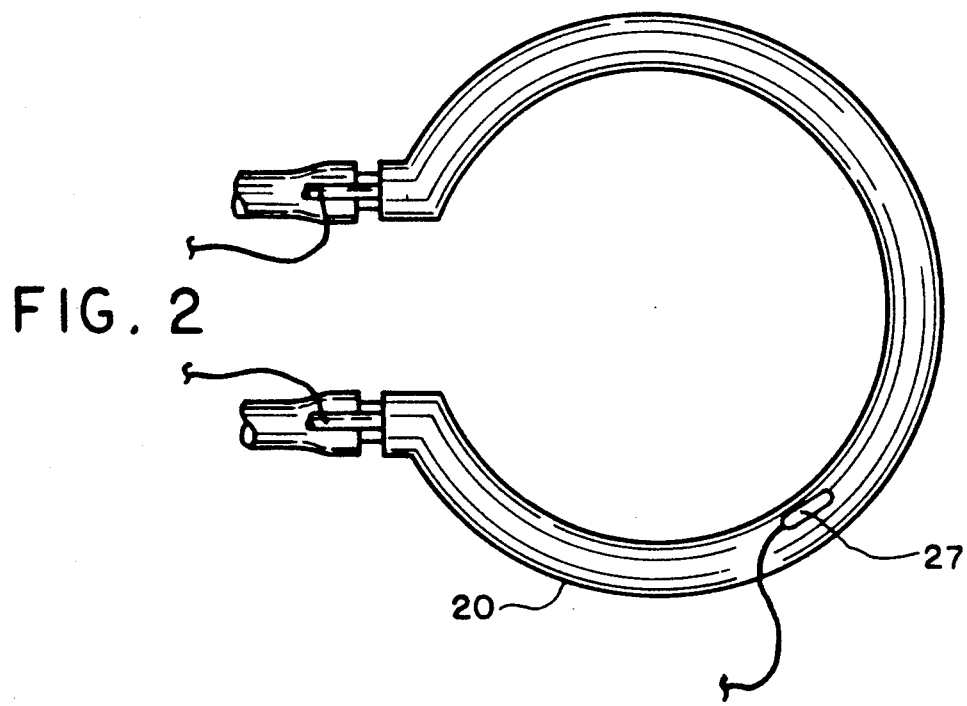
FIG. 2 is a view of the heating unit of the brewer of FIG. 1 viewing the top of the heating unit from along line 2—2 in FIG. 1.

The preferred embodiment of the present invention as illustrated in FIG. 1 is shown in a coffee brewing machine 10, having a cold water reservoir 11, which is open to atmosphere, for receiving a charge of water to be heated and used in a coffee brewing operation, a beverage infusion basket 12, and a beverage vessel 13, providing a receiving container which is heated to maintain the warm beverage in a heated condition which is commonly and alternatively referred to as "hot" or "warm".

Figure 3:
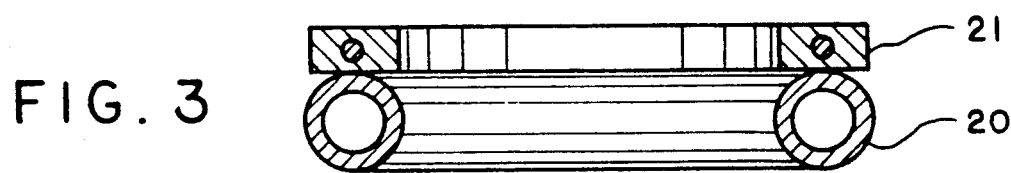
FIG. 3 is a cross-sectional view of the heater unit shown in FIG. 2 taken from along line 3—3.

The machine includes heating means comprising a water heating unit 14 which, in the illustrated embodiment is a conventional U-shaped or horseshoe type water heater having a water tube 20 fixed to and heated by a calrod heater element 21 as shown in FIG. 3. The water tube 20 receives water by gravity from the cold water reservoir 11 through a water conduit 15, and a unidirectional check valve 17 is provided which allows water to flow downward by gravity but keeps heated water from being pumped back to the cold water reservoir. The heating element 21 is energized to heat the water for brewing purposes. A temperature sensing means 27 is on the water tube 20. Once the water has reached a sufficiently high temperature, the associated vapor of the water will pump the charge up through water conduit 18 into the infusion basket 12 where the heated water will infuse the coffee charge and the coffee (or other infused drink) will flow by gravity into the vessel 13, where the coffee is to be maintained at an appropriate drinking temperature. Once the hot water has been pumped into the infusion basket, another cold charge of water will flow from reservoir 11 into the heater unit 14 and the cycle will repeat until all of the cold water charge has been heated and pumped to the beverage infusion basket.

Figure 4:
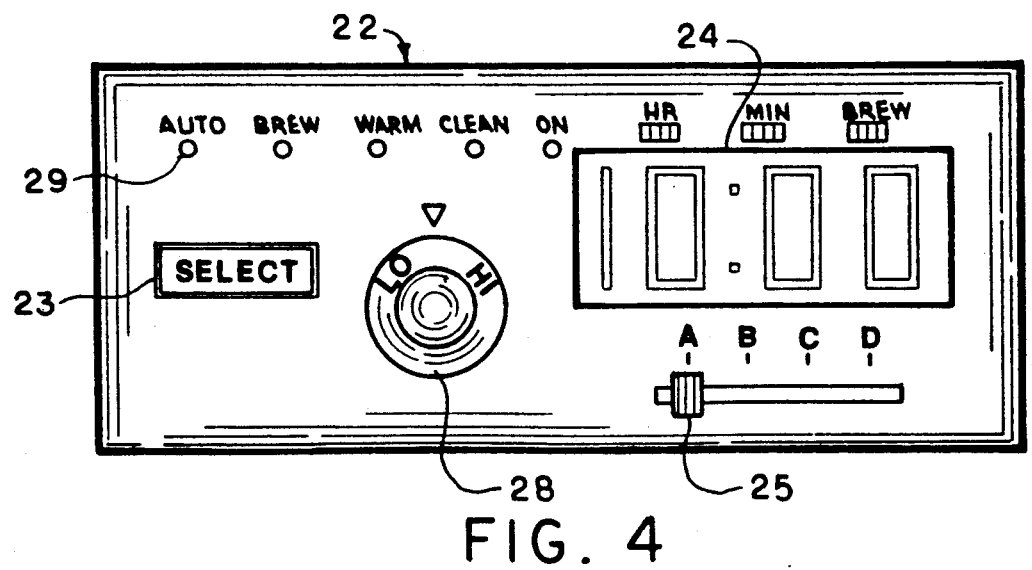
FIG. 4 is an enlarged form of the control panel shown on the brewer in FIG. 1.

Referring to FIG. 4, the machine has a control system comprising a panel 22 including a momentary push button switch 23 for starting and selectively establishing various machine states, preferably a digital clock 24 settable by the user to start the machine at a selected time of a 24 hour day, an optional mode select switch 26 to select auto or manual operation, and a selector switch 25 for selecting the automatic shut-off time period that begins with the start of the brewing operation. A mode switch could be provided to selectively choose a manual mode, in which the heating cycle can only be started by the momentary push button switch 23, or to choose an auto mode to enable the control system to respond to a signal from the user set time clock 24 as well as the push button switch 23 or an external input such as a modem, etc. The panel includes indicator lights 29 for indicating various states and conditions of the machine as described hereafter and user controls for the machine, such as operator adjustable temperature control 28 for the WARM mode.

Figure 5A:
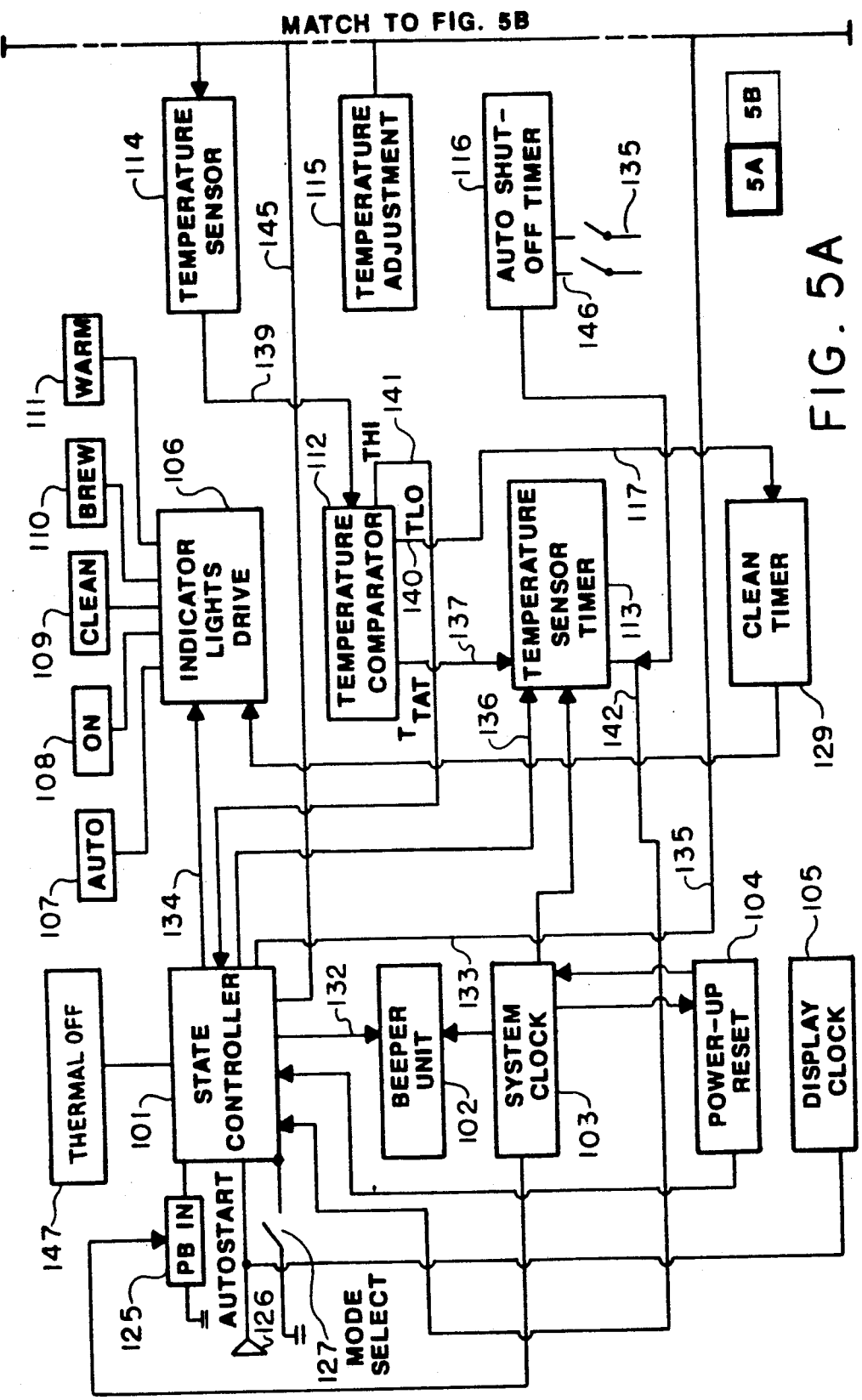
FIGS. 5A and 5B together form a functional block diagram of an embodiment of the invention.

A schematic block diagram of an illustrative embodiment of the control system of applicant's invention is shown in FIGS. 5A and B. An A.C. source 124 provides power to a Power Supply 123. The Power Supply, through the use of a capacitor, rectifiers and voltage regulators provides an appropriate voltage, typically 5 V to power all of the logic units contained in the apparatus and eliminates the need for a power supply transformer. This low voltage floats on the neutral lead of the A.C. line and allows the triac (described below) to be driven directly.

The power supply also provides full line voltage through connection 130 to the Power Control Unit 119. The Power Control Unit is a semiconductor, such as a triac, which can be turned on and off at every A.C. cycle, to provide full or partial power to the Heating Unit 118 through the connection 131. The connections of the Power Supply to the other blocks have been omitted for the sake of clarity. When power is applied to the unit and the voltage at the Power Supply reaches a predetermined voltage V greater than V preset, a reset pulse is generated by the Power-up Reset Circuitry (PWR-UP RESET) 104. The Power-up Reset Circuitry 104 resets all of the state control flip-flops in State Controller 101 (described hereinafter) to the system OFF condition regardless of past status; tests the System Clock Oscillator Divider 103 and the Beeper Unit 102. If the self test does not detect any malfunctions with the master oscillator and clock divider stages, the Power-up Reset Circuitry 104 is reset by the System Clock 103, leaving the State Controller 101 in the OFF state and ready to receive further inputs to effect state changes.

State Controller 101 through functional connection 134 activates the Indicator Lights Drive 106 which in turn activates Indicator Lights 107 through 111 according to the state of the machine. When power is applied and the machine is reset, all of the indicator lights are in the OFF condition.

Once power has been applied to the system, the apparatus is ready to commence operations and is in the OFF or A state. The only input which can change the state of the machine at this time is PB (push button) 125 (described below) corresponding to the Select Switch 23 of FIG. 4. If PB is activated by being momentarily pressed, the corresponding input will cause the State Controller 101 to change to the AUTO or B state or to the BREW or C state depending on the condition of the Mode Select Input 127. If the Mode Select Input is open (manual operation), the State Controller 101 will change to the BREW or "C" state and the brewing cycle will commence. If the Mode Select Input is closed (auto operation), then State Controller 101 will change its state to AUTO. Once in the AUTO or B state, a further state change can occur either by temporarily closing PB switch 125 or automatically by sending a negative pulse to "Auto Start" control terminal 126. The source of the Auto Start mode may be a display clock 105 settable by the user and incorporated in the apparatus, an external telephone modem, a computer output or other external or remote input source implemented by the user. If optional switch ("Mode Select") 127 is open, the apparatus can only be operated manually. If switch 127 is closed, the apparatus can either be operated manually or through the auto start mode. In the description of the embodiment, it is assumed that switch 127 is closed. The operation with switch 127 open is a subset of the operation with switch 127 closed.

Once either inputs 125 or 126 have been activated, the State Controller circuitry 101 will activate, through output 132, Beeper Unit 102. The beeper unit is receiving a medium frequency signal (approximately 4 KHZ from System Clock 103) for approximately one second, thus informing the operator of a change of state. The beeper unit is similarly activated during all state changes. The audible signal could obviously be eliminated in other embodiments without loss of basic performance.

State Controller 101, which is composed of a series of flip-flops and associated gating circuitry, sends a control signal through connection 134 to the Indicator Lights drive circuitry 106 and the Auto light 107 is activated. At this point, the apparatus is ready for operation but needs an additional instruction input, either through the manual PB input 125 or through the Auto Start terminal 126 to initiate the brewing process. The present embodiment uses a digital Display Clock 105 to activate the Auto Start input at a specified time. Clearly other interface controls could be implemented by the user to activate the apparatus at the desired time or when predetermined conditions set by the user are met. If either PB control 125 is depressed or Auto Start terminal 126 receives a low signal, the State Controller 101 changes its state to the BREW or "C" state and activates the following functions:

1) The Beeper Unit 102 is activated for approximately one second to alert the user of the change in state.

2) The State Controller flip-flops change of state cause the Indicator Lights Drive circuitry 106 to turn on the ON Light 108 and the Brew Light 110.

3) The State Controller generates a D.C. signal in the high state on line 145 which enables Power Controller Unit 119. In the BREW mode the State Controller 101 also delivers a voltage state through line 135 to the Power Level Selector circuitry 122.

The function of the Power Level Selector circuitry 122 is to control whether the Power Control Unit is on essentially for the full A.C. cycle, as in the case of the BREW mode, or for only a portion of the A.C. cycle, as in the WARM mode.

Figure 6:
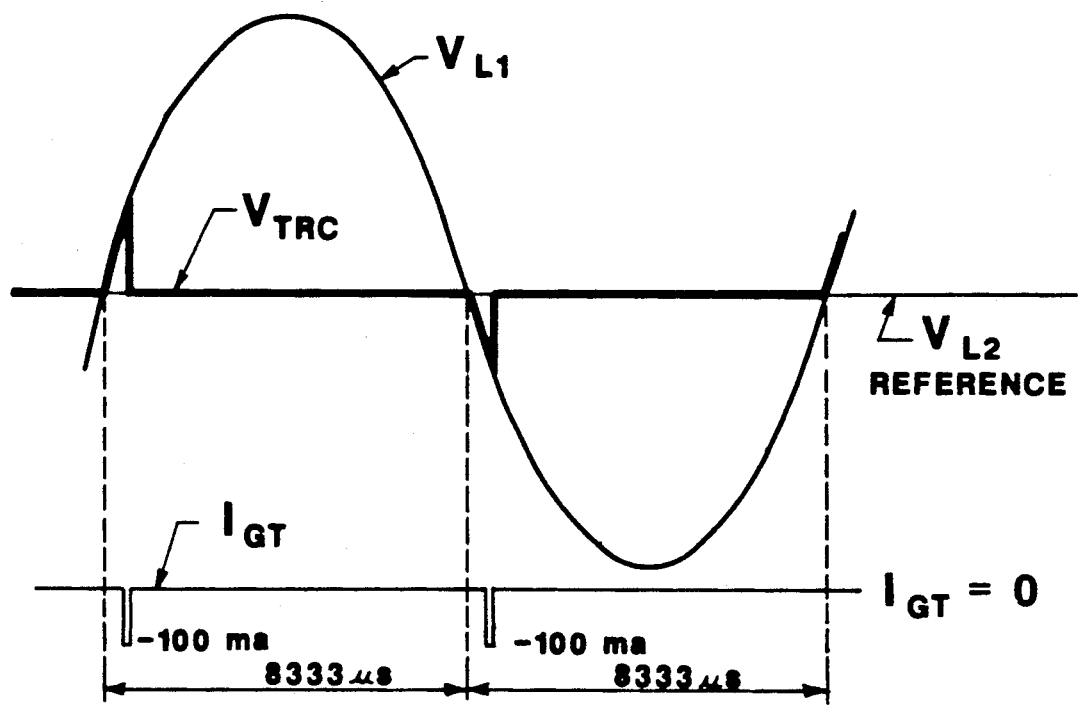
FIG. 6 shows the A.C. waveform and the triac waveform during the BREW cycle.

The Power Control Unit is a semiconductor (i.e., triac) which can be fully turned on every half A.C. cycle of the A.C. line voltage. In the BREW mode, once it has been enabled, the power control unit is fully turned on each half A.C. cycle, approximately 600 82 s after the line voltage has crossed a zero voltage, by a negative pulse generated by the Trigger circuit 120. In the BREW mode the Zero Crossing detector 143 detects the change in sign of the A.C. voltage $V_{L1}$ of FIG. 6 and activates the Trigger Delay circuit 144 which after approximately 600 μs activates the Trigger Circuit whose output $I_{GT}$ of FIG. 6 fires the Power Control unit. This represents the high power operation of the apparatus. The output of circuit 120 is shown in FIG. 6 as $I_{GT}$. The line voltage is also shown in FIG. 6 as $V_{L1}$ with $V_{TRC}$ representing the voltage across the Power Control Unit 119. When the Power Controller is fully on, the full line voltage is applied across Heating Unit element 118. When power is turned on to the Heating Unit 118, the Temperature Sensor Timer 113 is also activated by an input signal on line 136 from the State Controller. The Sensor Timer (a counter fed by the System Clock 103) counts for approximately one minute unless it is reset by an output $T_{TAT}$ 137 from Temperature Comparator 112 as described below.

As power is applied to the Heating Unit 118, the Temperature Sensor 114 (i.e., a thermistor) provides a signal on line 139 to the Temperature Comparator 112. The Temperature Comparator has three outputs labeled $T_{TAT}$ on line 137, $T_{LO}$ on line 140 and $T_{HI}$ on line 141. These outputs are activated whenever the temperature of the heating unit exceed the preestablished reference temperature for these three outputs. These temperatures have been chosen to be approximately 90° C. for $T_{TAT}$, 150° C. for $T_{LO}$ and 170° C. for $T_{HI}$. Other levels could be chosen to suit particular heaters, uses or liquids.

If T (temperature of heating unit) is not greater than $T_{TAT}$ before the Temperature Sensor Timer 113 completes its counting cycle, no output will occur at the $T_{TAT}$ output of Temperature Comparator 112 and the Temperature Sensor Timer 113 will generate a pulse on line 142 which will reset the State Controller to the OFF or A state, turn off all indicator lights and turn off all power to the heating unit. The operation of the apparatus is thus interrupted. This condition can occur for several reasons and the interruption of the cycle provides safe operation. The temperature of the heating unit may not reach the prescribed 90° C. within the allowed time for the following reasons:

1) the Heating Unit is open or defective and no heat is generated;
2) the thermistor is non-operational;
3) a thermal fuse is open;
4) the Power Control Unit is non-operational or
5) the Vessel Detector 128 is open (no receiving carafe).

Under any of these conditions, the BREW cycle should be discontinued.

If the temperature of the Heating Unit exceeds 90° C. before the Temperature Sensor Timer times out, then the Temperature Comparator will generate a signal $T_{TAT}$ on line 137 which will reset the timer and allow the brewing process to continue.

Figure 7:
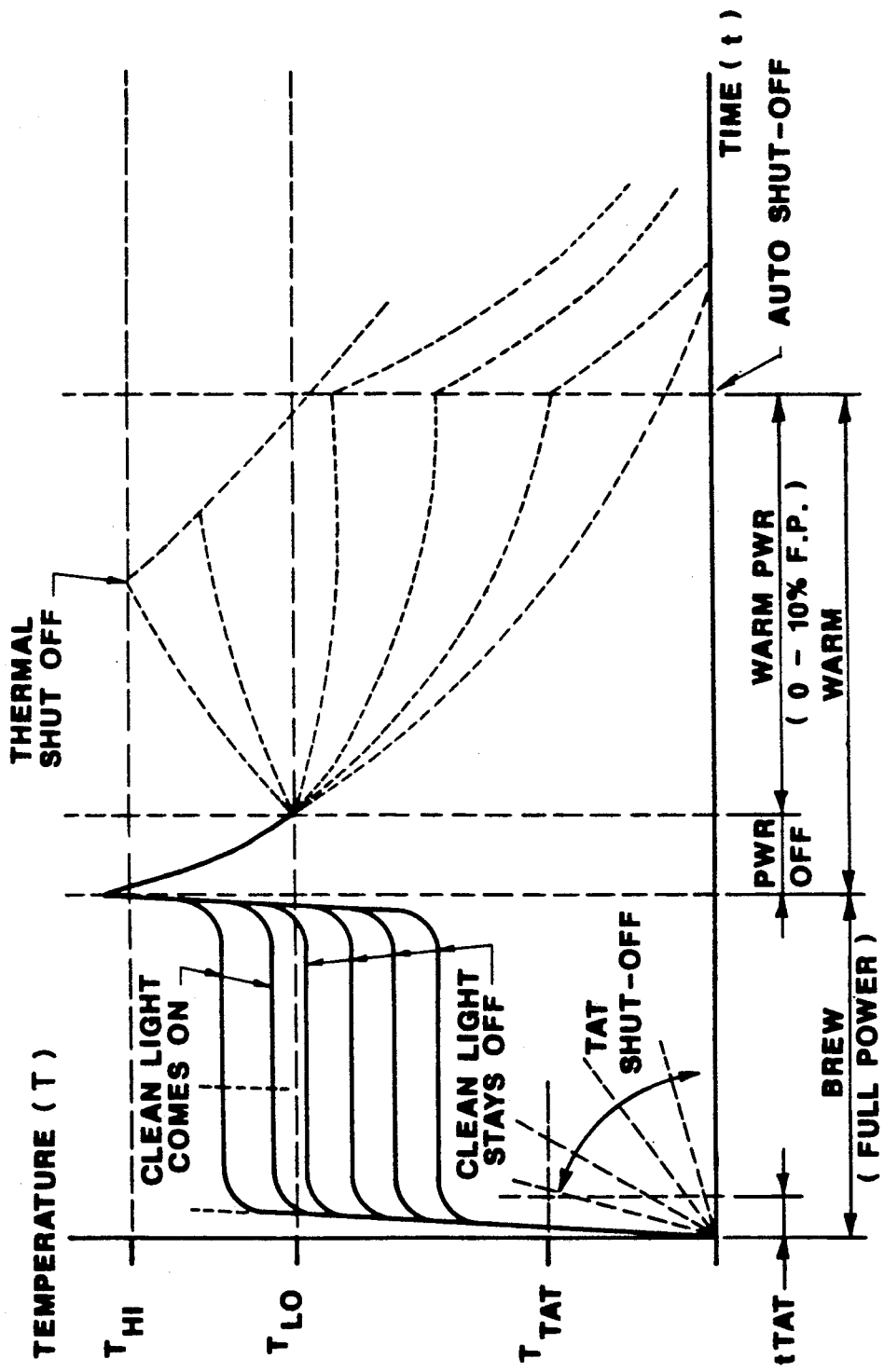
FIG. 7 is a temperature graph for a typical complete operating cycle.

The temperature profile of the Heating Unit is shown in FIG. 7. The vertical axis represents temperatures of the Heating Unit while the horizontal axis represents time. The various temperature profiles contained within the BREW time on the horizontal axis are possible temperatures achieved by the heating element during a typical BREW cycle. The various dotted temperature profiles labeled "TAT SHUT-OFF" represent possible abnormal conditions where the temperature of the Heating Unit does not increase with sufficient rapidity because of the occurence of one or more of the malfunctions or conditions listed above. If T is less than $T_{TAT}$ ($T<T_{TAT}$) after the Temperature Sensor Timer 113 has completed its timing cycle, the Temperature Sensor Timer 113 will reset the State Controller 101 to the OFF or "A" state via line 142. Under normal operating conditions, T will exceed $T_{TAT}$ before timer 113 has gone through its counting cycle, but will remain below $T_{LO}$ until the end of the BREW cycle. During this period all of the fluid will be discharged from the reservoir into the vessel through the infusion basket, after having been heated by the Heating Unit.

Once all of the fluid has run through the Heating Unit, the temperature of the Heating Unit will continue to rise since it is no longer cooled by the fluid. The Temperature Sensor 114 will eventually detect a temperature higher than $T_{HI}$ and the Temperature Comparator 112 will have an output $T_{HI}$ on line 141 which will change the state of the State Controller 101. This change of state disables the Power Controller 119 so that no further power is applied to the Heating Unit 118. The State Controller 101 will also activate, through Indicator Lights Drive 106, the Warm Light 111. The apparatus is now in the WARM or D state. Once this state has been achieved, the State Controller also switches the Power Level Selector 122 to enable Phase Controller 121. The phase of the Phase Controller 121 is adjustable through Temperature Adjustment means 115 which is adjustable by the user.

During the transition from BREW to WARM, the Power Controller 119 has been disabled and thus the temperature monitored by the Temperature Sensor 114 starts decreasing as shown by the temperature profile in the PWR OFF time period of FIG. 7. When the Heating Unit temperature decreases to $T_{LO}$ the Temperature Comparator will have an output at the $T_{LO}$ terminal 140. This output causes State Controller 101 to enable once more the Power Controller 119. At this stage, power is applied for a portion of the line cycle.

Figure 8:
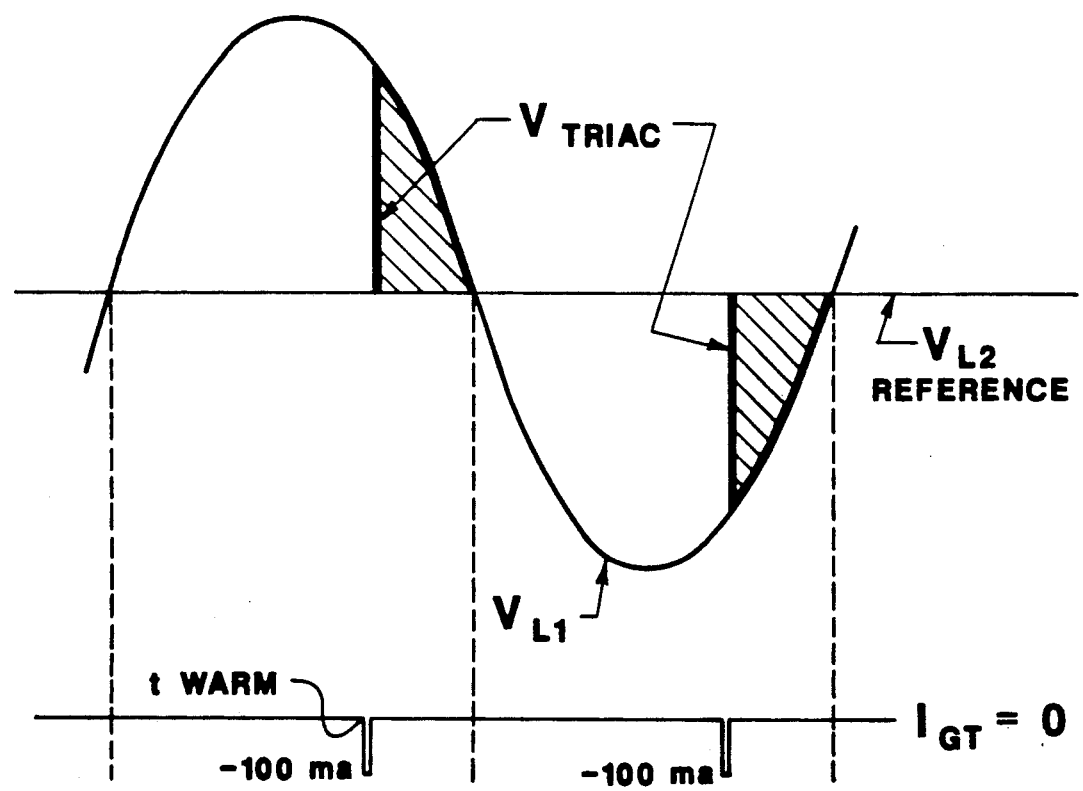
FIG. 8 shows the A.C. and triac waveform during the WARM cycle.

As shown in FIG. 8, the Phase Controller 121 will delay the triggering of the Power Controller 119 until a later time ($t_{WARM}$) of the power half cycle. The actual trigger time can be adjusted by Temperature Adjustment 115 and thus the total amount of power delivered to t the Heating Unit is reduced to achieve the appropriate temperature level of the hot beverage during the WARM state. The dashed portion of the A.C. cycle in FIG. 8 represents the portion of A.C. line voltage applied to the Heating Unit 118 during the Warm cycle. "$t_{WARM}$" may be advanced or delayed to control the temperature of the drink in the vessel.

If T, for lack of liquid in the vessel or other reason again increases above $T_{HI}$, the second $T_{HI}$ output of the Temperature Comparator 112 will cause one of two events to occur. If the Thermal Shut-off input 147 is in a high state then the output $T_{HI}$ 141 will change the state of the State Controller from WARM to OFF and the apparatus is turned off. All indicator lights will also be turned off with the exception of the Clean Light 109 if it had been activated during the Brew cycle.

If the Thermal Shut-Off input was set low, then the State Controller 101 stays in the WARM state but via line 145 disables Power Control unit 119, turning power off to the Heating Unit 118 until the temperature falls below $T_{LO}$ at which time heating is reactivated and the cycle repeats until the WARM state ends.

Thus the apparatus may be turned to the OFF condition when T becomes greater than $T_{HI}$ for the first time during the WARM state or, when the Thermal Shut-Off input is low, if the optional Auto Shut-off Timer 116 times out.

An additional feature of the apparatus is to warn the operator when mineral deposit build up is present in the heating unit chamber in amounts requiring the apparatus to be cleaned of such deposits. Mineral deposits on the walls of the water tube of the heating unit 114 act as an insulator. During the brewing cycle, the temperature of the heating unit is controlled by the cold fluid entering the water tube. As deposits build up the cooling effect is reduced and the heating unit will achieve a higher temperature. This temperature is constantly monitored by the Temperature Sensor 114. If during the BREW cycle, T is greater than $T_{LO}$, as shown in FIG. 7 in the family of curves above $T_{LO}$, then the temperature comparator 112 will have an output at $T_{LO}$. $T_{LO}$ output on line 140 will activate Clean Timer 129 which after a few minutes will activate the Indicator Lights Drive 106 and turn on the Clean light 109. The light will not be activated if the BREW cycle ends before the Clean Timer 129 turns on the Clean light. This assures that T is greater than $T_{LO}$ for a sufficiently long time during the BREW period. The light will remain on throughout the remainder of the cycles and will only be reset if the apparatus is totally reset after a power interruption, or by the starting of another BREW cycle.

A further advantage of the apparatus is that a complete cleaning of the deposits can be accomplished in an unsupervised mode by the operator. Since the states of the apparatus can be selected independently without need to go through the prescribed cycle of BREW-WARM, the user can select the WARM mode and fill the reservoir with a liquid acid solution such as common vinegar. The acid will flow through the check valve 17 into the chamber of the heating unit where it will be heated at the reduced power rate of the WARM mode.

This causes the discharge of the liquid into the infusion basket to be delayed substantially and allow a high residence time of each acid charge in the heating unit. This high residence time causes each successive charge to better dissolve the deposits and at the end of the cycle the heating unit is completely free of deposits.

The Auto Shut Off Timer 116 is an internal counter driven by the System Clock 103 of the apparatus which allows the operator to select different times at which the apparatus will be shut off. Once the selected time span has elapsed the Auto Shut Off Timer will automatically reset the machine through the State Controller 101 to the OFF or A state.

Figure 5B:
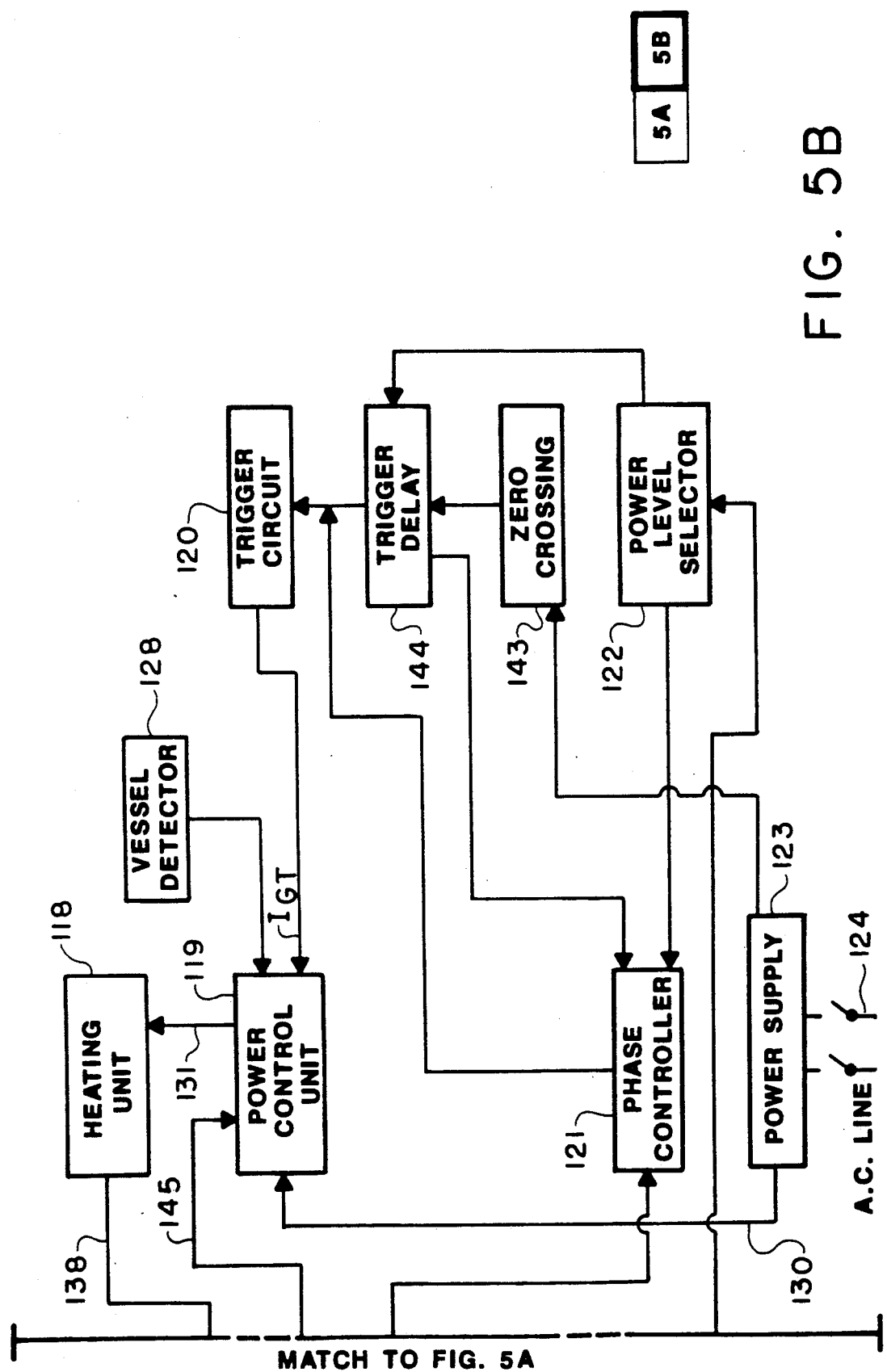
Figure 9A:
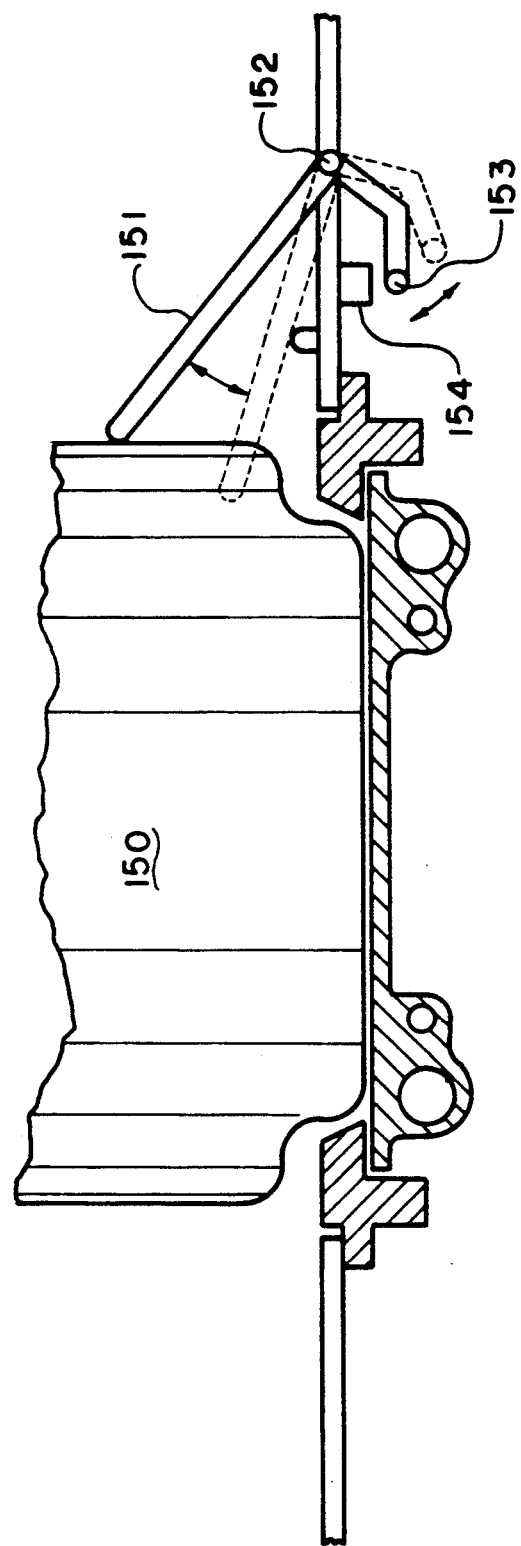
FIGS. 9A-9C show several embodiments of the vessel detector.
Figure 9B:
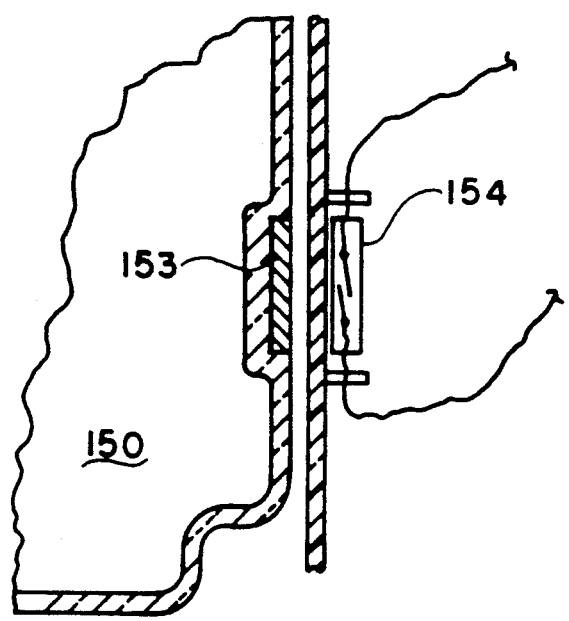
Figure 9C:
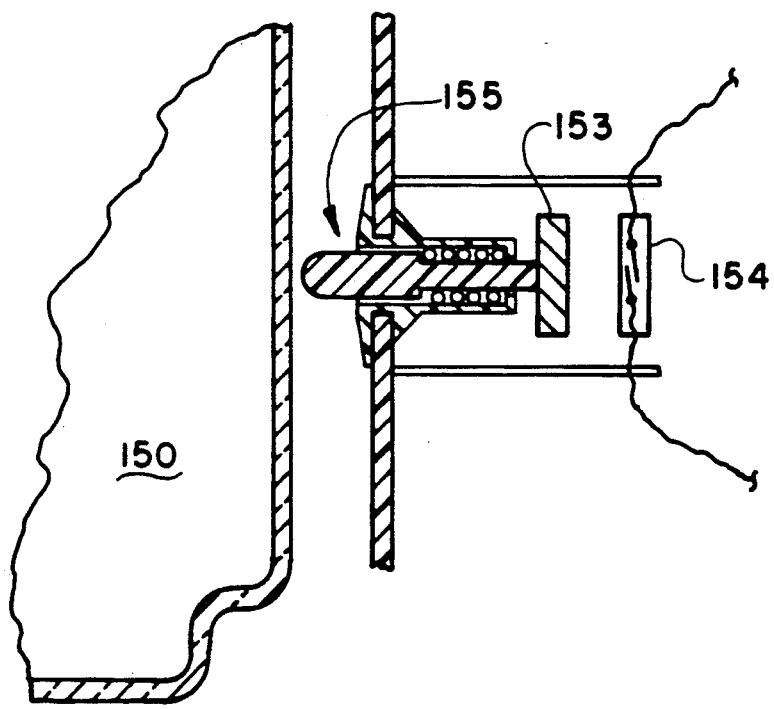

FIGS. 9A-9C show three different embodiments of Vessel Detector 128 of FIG. 5. In all embodiments a magnetic reed switch 154, which is connected in series with Power Control Unit 119 of FIG. 5, is normally closed and thus conducting when the vessel 150 is on the heater of the apparatus. In this condition power is applied to the heating unit during the various states according to the operational demands of the various states. If the vessel 150 is removed in embodiment 9A, actuator lever 151 pivoted around pivot 152 rotates downward by the action of gravity, causing permanent magnet 153, which is rigidly connected to the extension of lever 151, to move away from the reed switch 154 which will thus open interrupting the current flow to the heating means. In embodiment 9B a permanent magnet 153 is installed in the wall of the vessel 150 and the reed switch 154 is installed in the wall of the apparatus to be operatively controlled by the magnet in the vessel. If the vessel is removed, the reed switch will open thus interrupting the current flow to the heating means. In embodiment 9C, the vessel controls the movement of a push button actuator 155 installed in the apparatus. The push button is spring loaded with a bias towards the vessel and is attached to magnet 153. When the vessel is removed, push button actuator 155 moves outwardly towards the vessel side causing magnet 153 to move away from reed switch 154 which will thus open causing an interruption of current flow. In all three embodiments the return of the vessel to the apparatus will cause magnet 153 to come into proximity to switch 154 and thus re-establish current flow.

Figure 10A:
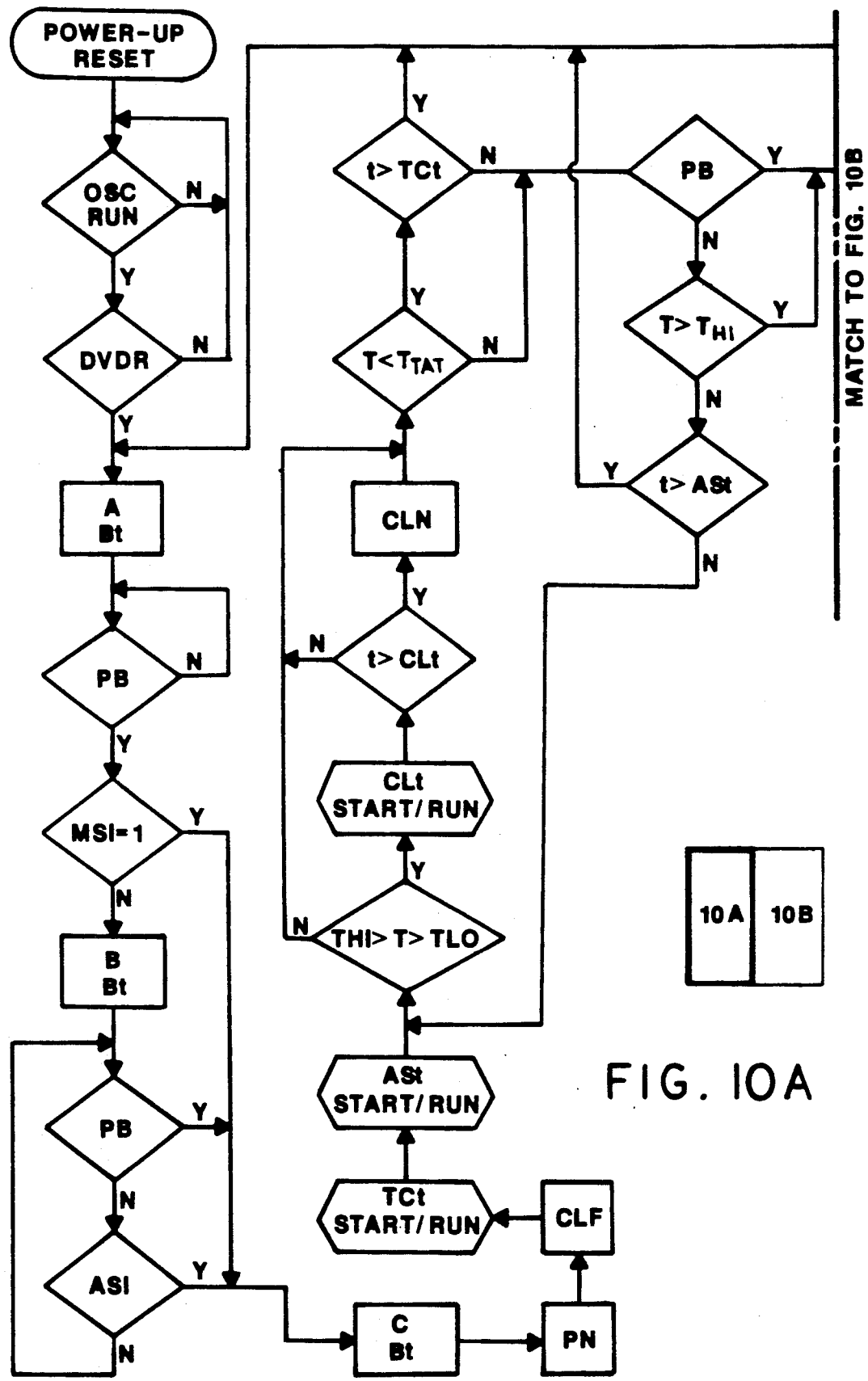
FIGS. 10A and 10B together form a logic flow diagram of the embodiment shown in block diagram form in FIGS. 5A and 5B.
Figure 10B:
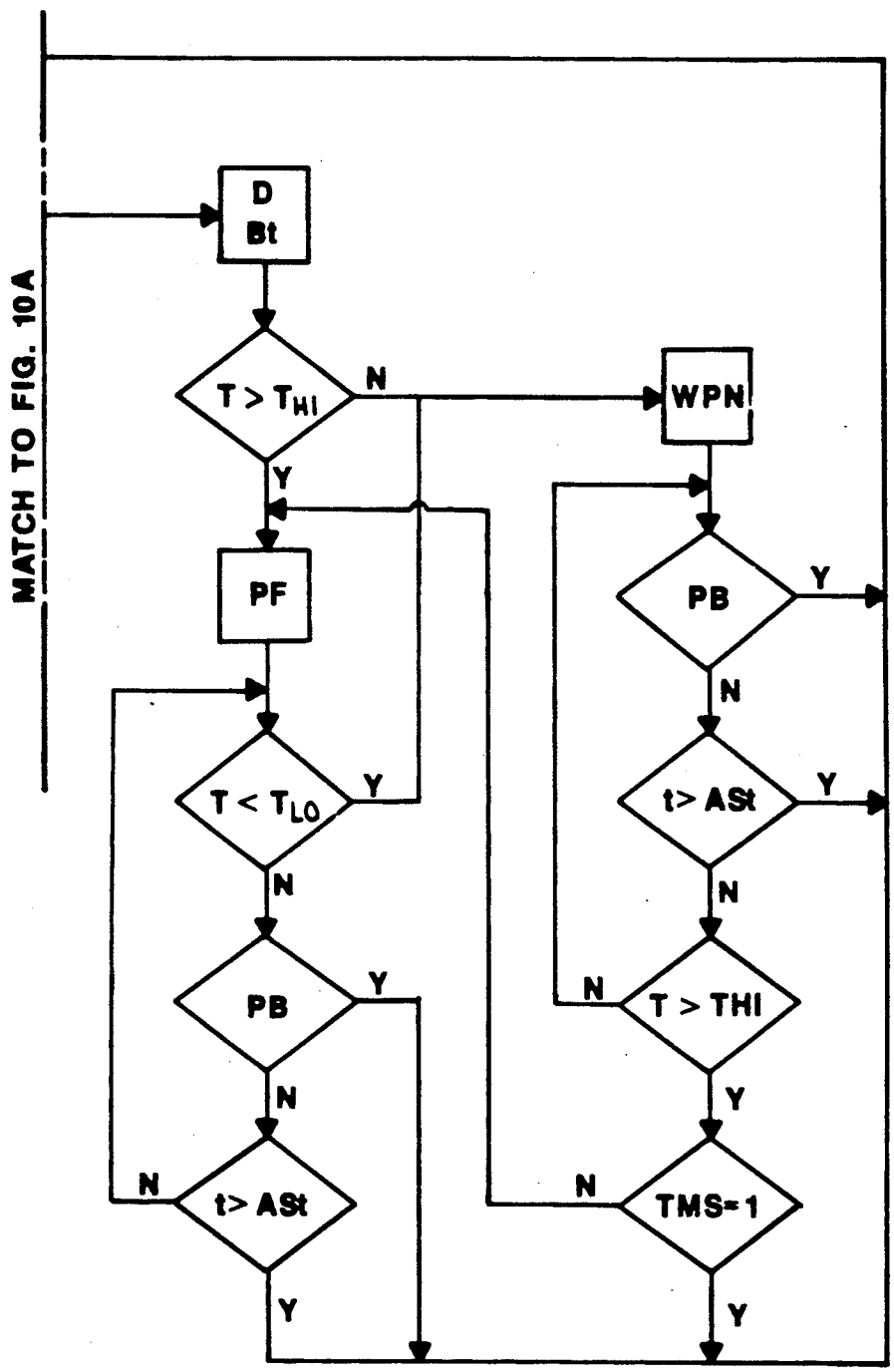
Figure 10B:
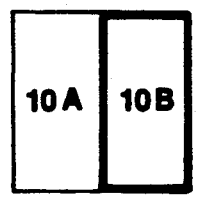
Figure 11A:
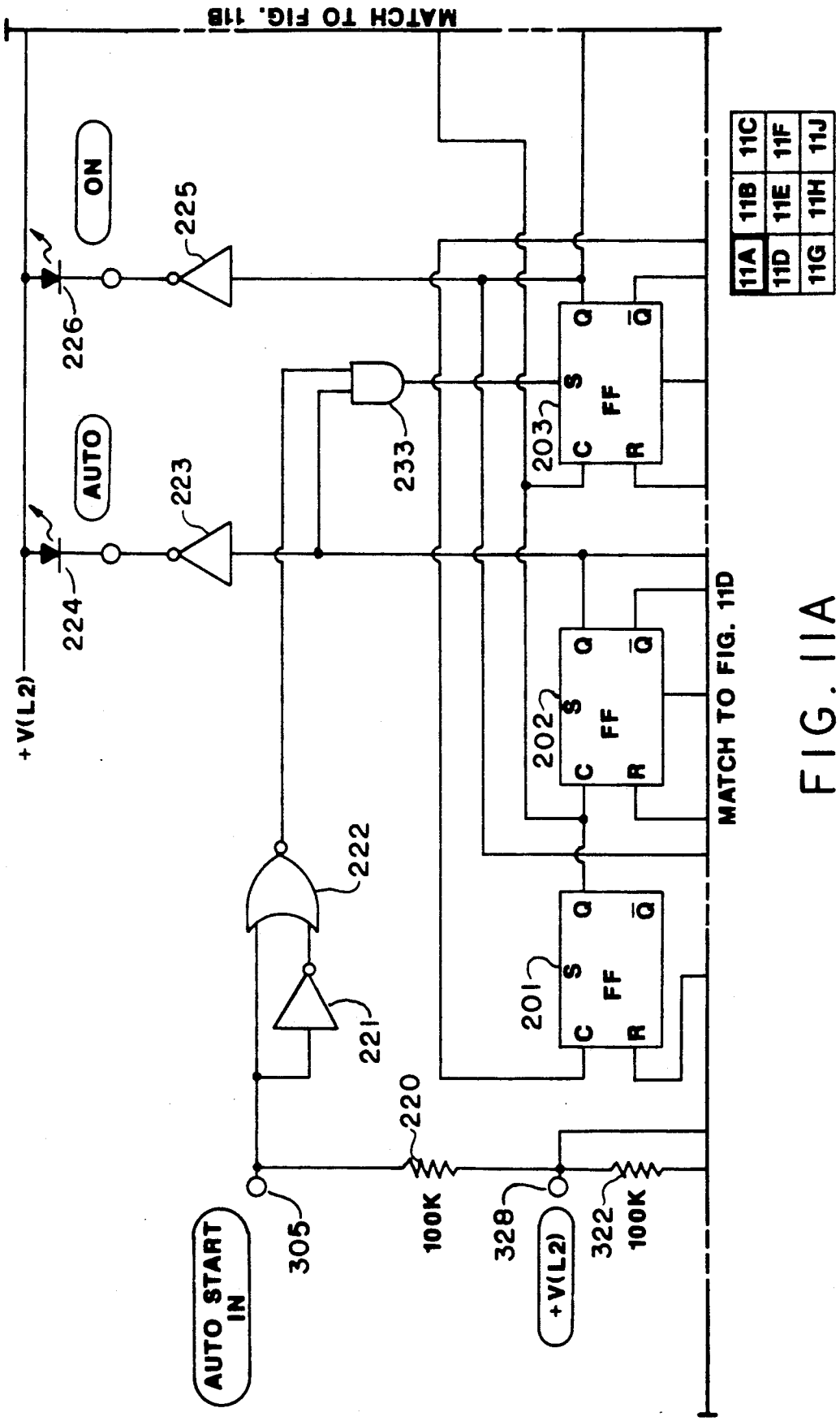
Figure 11C:
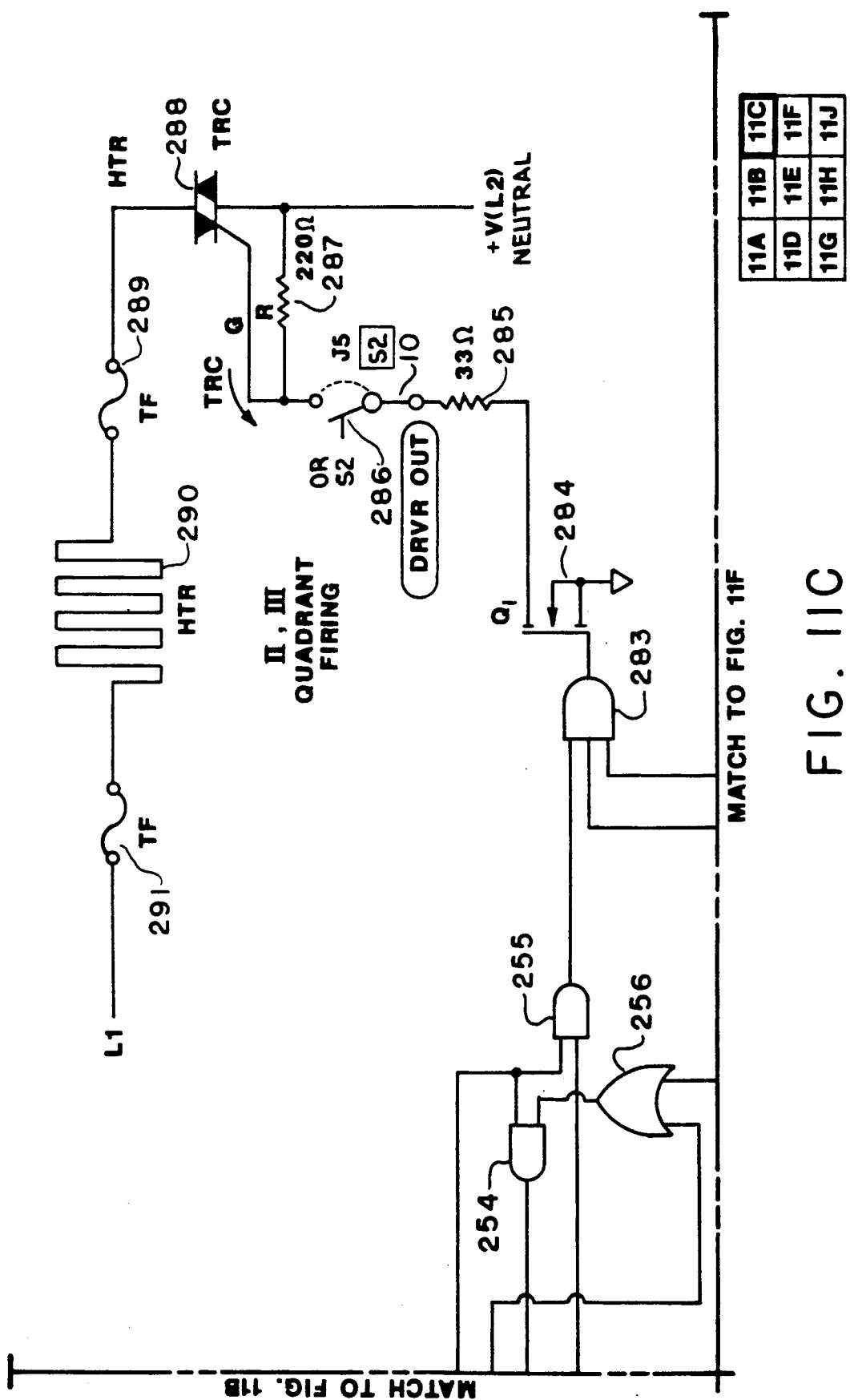
Figure 11D:
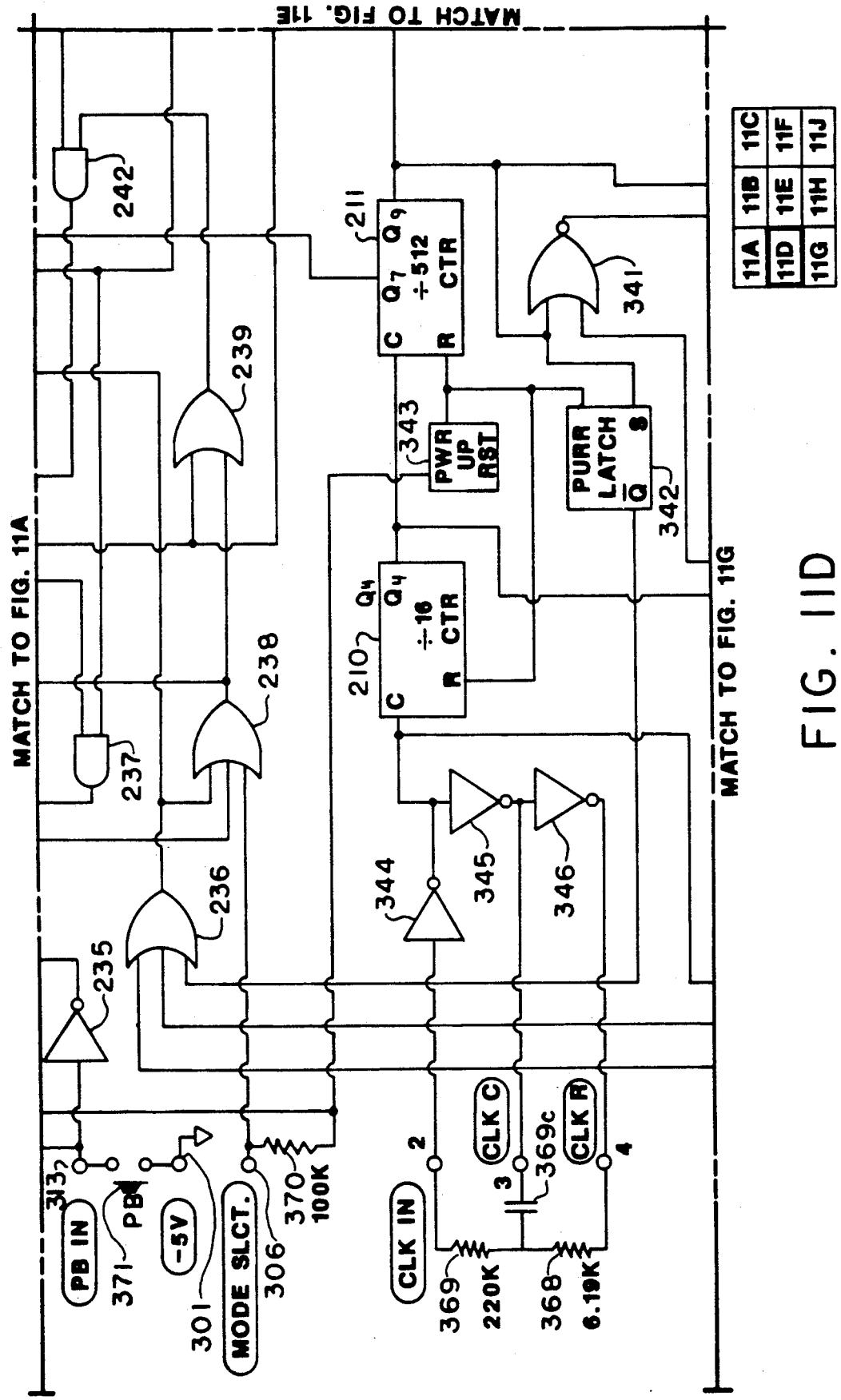
Figure 11E:
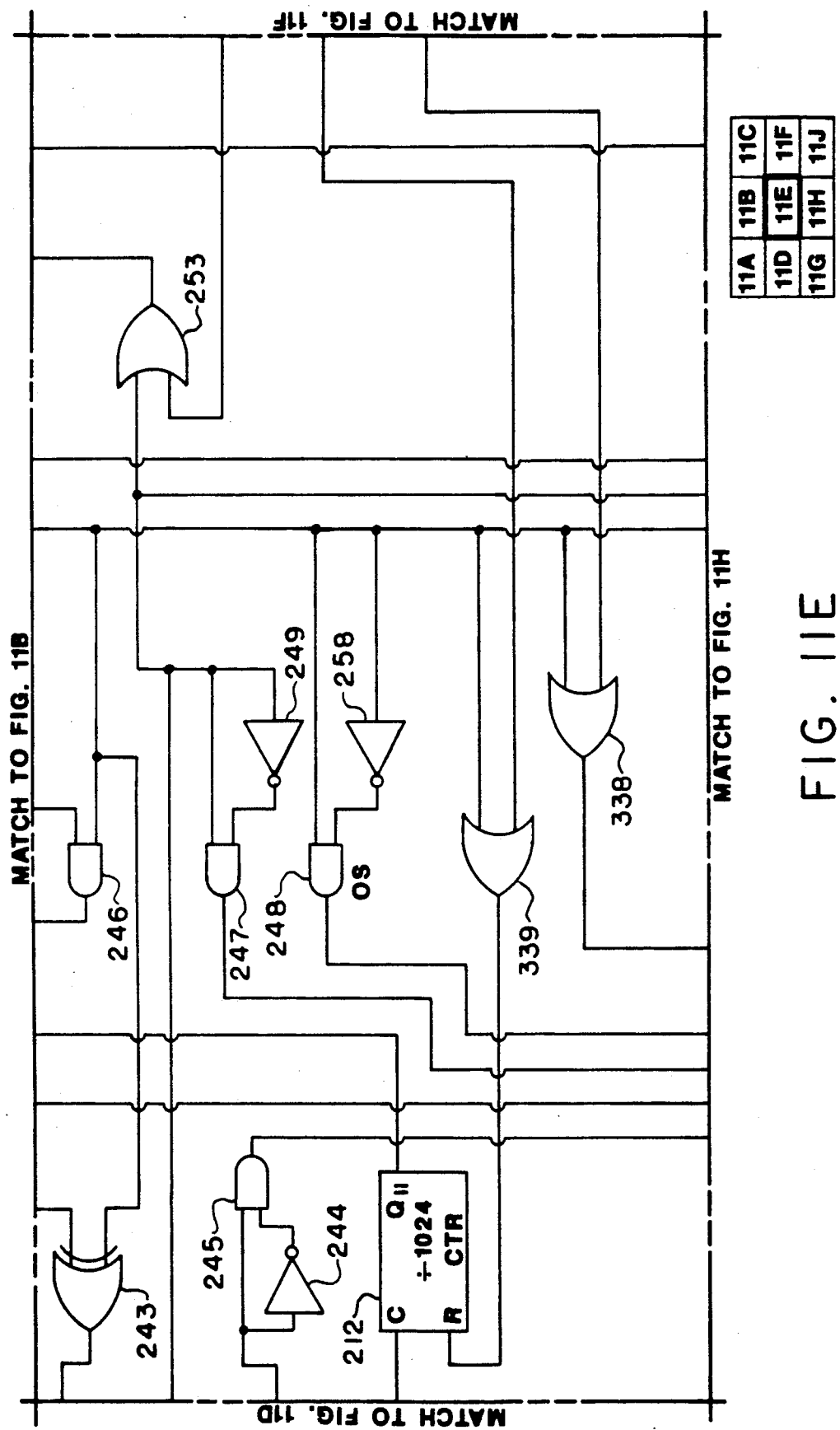
Figure 11F:
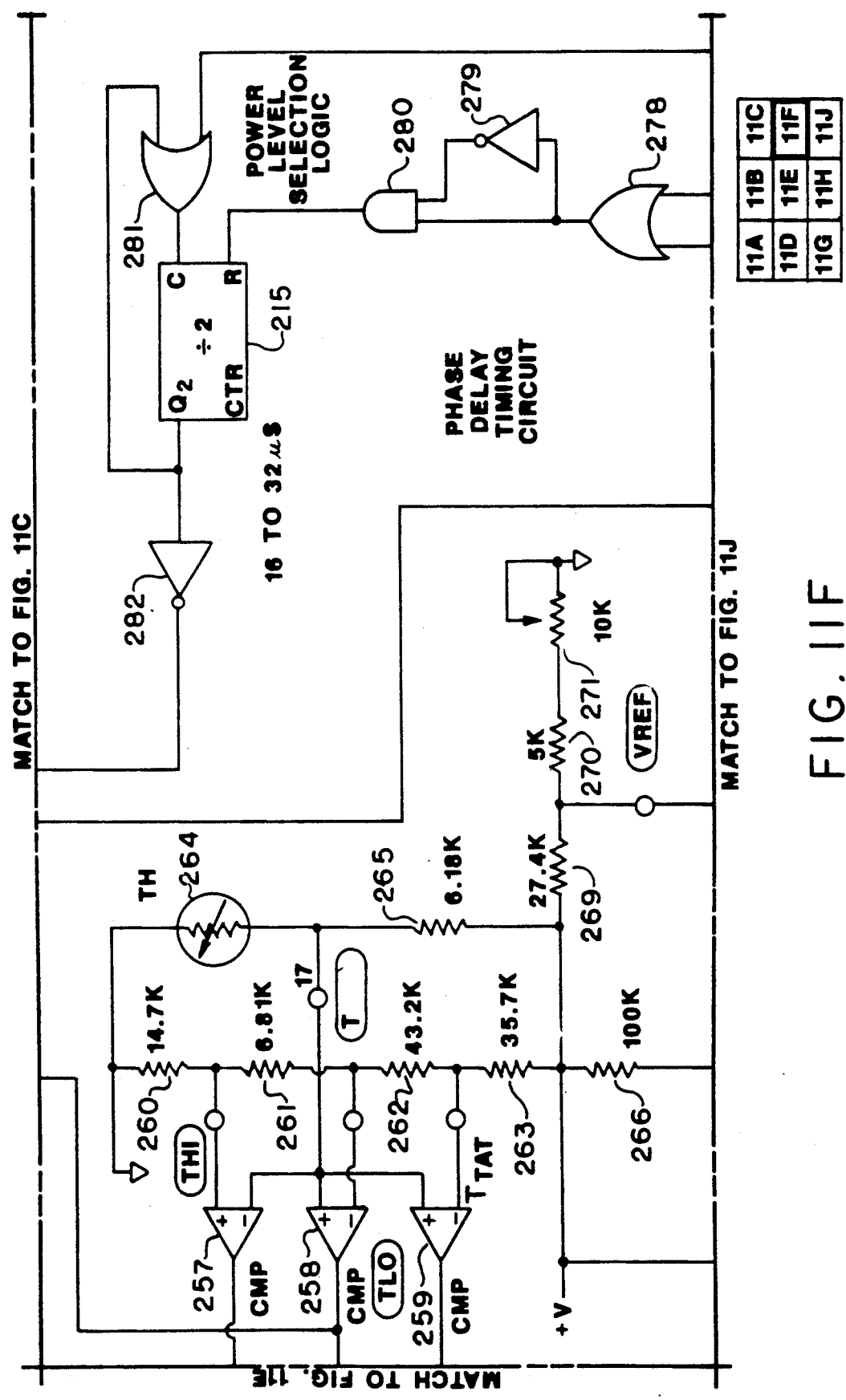
Figure 11G:
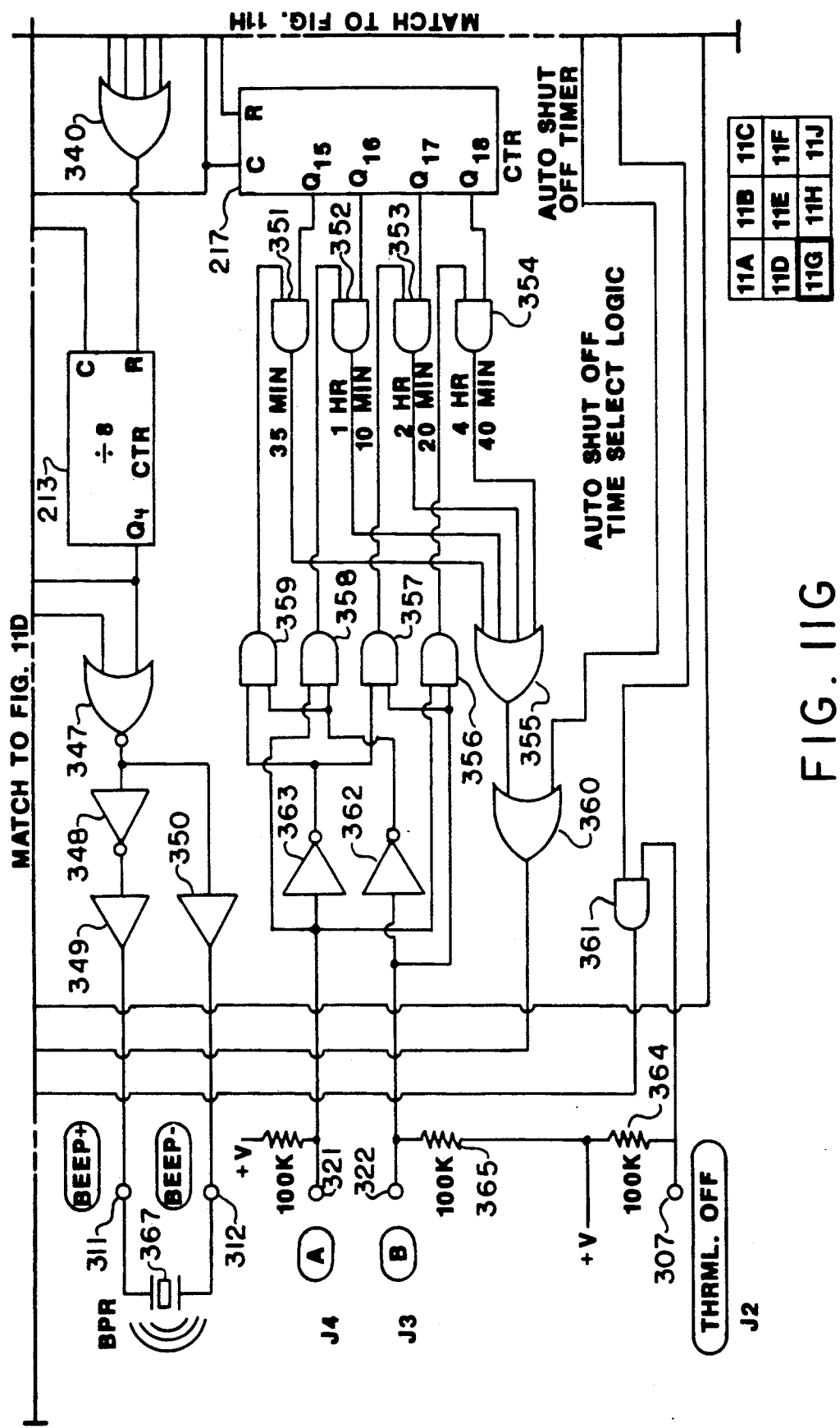
Figure 11H:
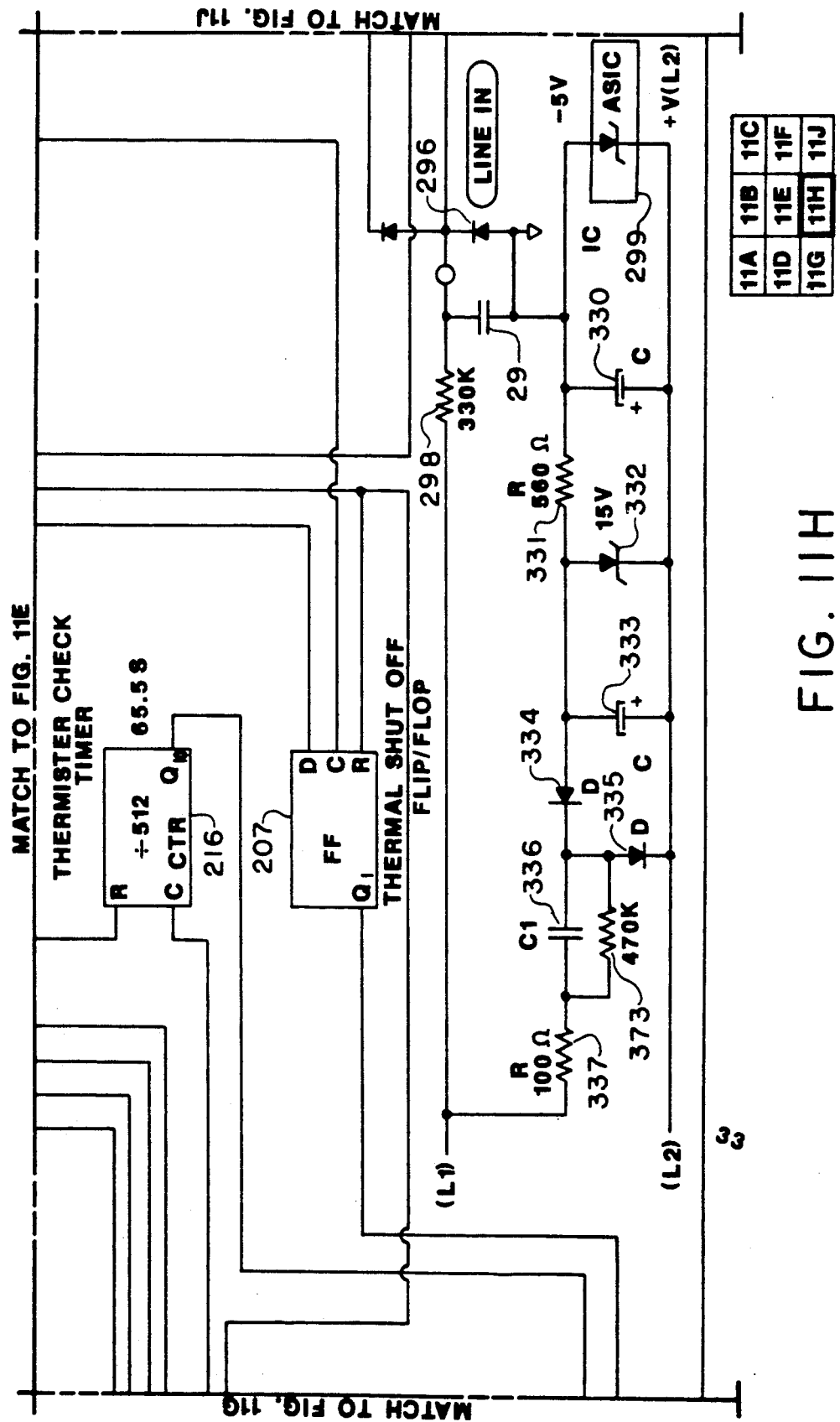
Figure 11J:
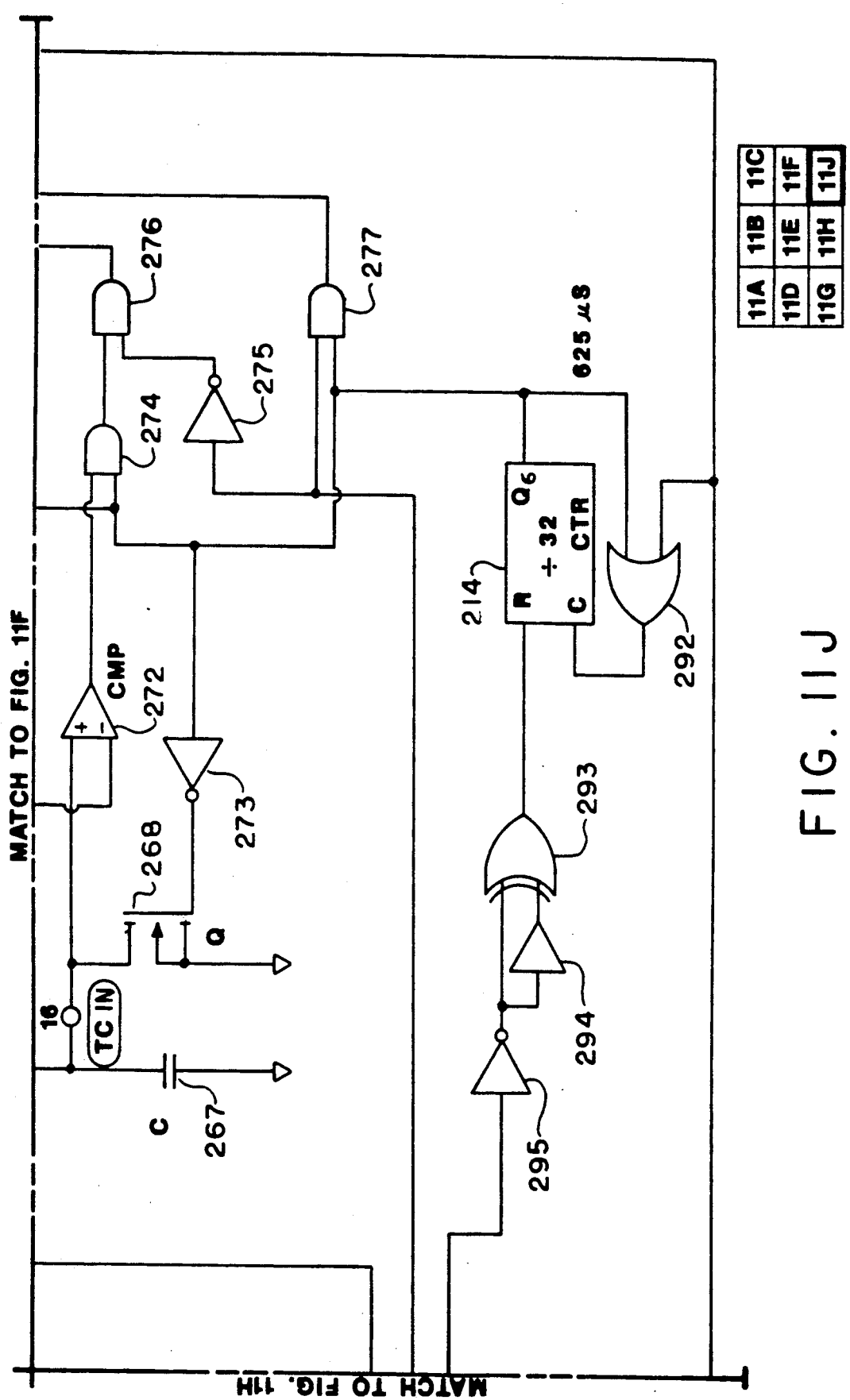

FIGS. 10A-10B are a logic flow diagram of the condition and apparatus responses of the embodiment represented in block diagram form in FIG. 5. Listed below are the abbreviations used in the logic diagram. Where appropriate, reference is made from the logic flow diagram to the functional block diagram of FIG. 5.

| | |
|---|---|
| PUC: | power-up-reset (104 FIG. 5) |
| OSC RUN: | oscillator run |
| DVDR OK: | divider/counters okay |
| A: | state (A) |
| Bt: | beeper/counter timer (102 FIG. 5) |
| PB: | push-button input (125 FIG. 5) |
| MSI: | mode select input (127 FIG. 5) |
| B: | state (B) |
| ASI: | auto-start input |
| C: | state (C) |
| PN: | power ON 100% |
| CLF: | clean light OFF, reset |
| t: | actual elapsed time |
| TCt: | thermistor check timer (113 FIG. 5) |
| ASt: | auto-shut-off timer |
| T: | temperature sensed by thermistor |
| $T_{TAT}$: | thermistor assurance temperature (137 FIG. 5) |
| $T_{LO}$: | low control temperature (140 FIG. 5) |
| $T_{HF}$: | high control temperature (141 FIG. 5) |
| CLt: | clean light timer (129 FIG. 5) |
| CLN: | clean light ON, set |
| D: | state (D) |
| WPN: | warm power ON |
| PF: | power OFF |
| TMS: | thermal shut-off mode select |

The logic diagram clearly defines the responses of the apparatus under all possible operating conditions. When power is applied to the apparatus (Power Up Reset), the OSC RUN logic determines if the oscillator is operating. If the answer is negative, the apparatus is shut off. If the oscillator is operating, the DVDR logic (divider/counter) determines if clock counters and dividers are operating. If the answer is NO, the apparatus is shut off. If the divider logic is operating properly, the apparatus activates the A (or OFF) state and Bt (beeper/counter timer) activates a beeper annuniciator. At this stage if PB is activated by the operator, and if MSI (mode select input) is Hi, then the output of MSI will activate the C (or BREW) state and the beeper Bt. If MSI is Low the B (or AUTO) state will be activated. If PB is activated again the Y output will activate the C (or BREW) state. Similarly, a Y output by ASI (auto start) will activate the C (or BREW) state.

Once the C state has been activated, PN (power on) is fully activated and CLF (clean light off) is reset. TCt (start run thermistor check timer) is reset and enabled and concurrently the ASt (auto-shut-off timer) is reset and enabled. During the BREW mode the temperature control logic monitors both the operation of the apparatus and of the monitoring hardware. If T is less than $T_{TAT}$ and the elapsed time t is greater than TCt, the apparatus returns to the A (or OFF) state and operation is discontinued. If t is not greater than TCt and T is no longer less than $T_{TAT}$, then operation continues.

If during the C state, the condition $T_{HI} > T > T_{LO}$ occurs, then the Clean Light Timer (CLt) is activated. If CLt timer reaches a full time count before the BREW cycle ends, and therefore the condition t>CLt is met, CLN (clean light on) is set and the CLt (clean Light Indicator) is activated. If the BREW state ends before the CLt time reaches a full count, the Clean Light Indicator is not activated. The BREW cycle will end either because PB is activated and apparatus changes to the D (or WARM) state or because the condition $T > T_{HI}$ is satisfied. Once the D state is activated and the Bt audible signal has been generated, if the condition of $T > T_{HI}$ is met, then PF (power off) is active. In this condition, the heating unit receives no energy and it starts cooling off. Then, if $T < T_{LO}$ is met, the WPN (warm power ON) is activated. In this condition a reduced amount of power is delivered to the heating unit to achieve the desired temperature level. At this stage the apparatus can be set to the A (or OFF) state by depressing PB again. If PB has not been depressed or activated and the elapsed time t is >ASt (Auto Shut Off Timer), the apparatus is also set to the A (or OFF) state. If the condition is not met, and $T > T_{HI}$ is not met, the apparatus continues to operate in the WARM mode. If $T > T_{HI}$ is satisfied, and, if the TMS (Thermal Mode Select) is in the high position (=1), the apparatus is set to the A (or OFF) state. If TMS=0 the apparatus returns to PF and the cycle repeats itself.

In the PF loop, if $T < T_{LO}$ is not satisfied but the lapsed time t>AST is satisfied, the apparatus is set to the A (or OFF) state. If the condition t>AST is not satisfied, the apparatus will stay in the WARM state until the condition is met.

FIG. 11 is a detailed schematic of an embodiment of the invention. L1 and L2 represent the A.C. line input. The values given for some components have been found to be very satisfactory. When power is applied, the power supply, consisting of resistors 337, 373 and 331; capacitors 336, 333 and 330, diodes 335 and 334 and zener diode 332, provide a −5 volts to zener diode 299 which, in this embodiment, is in an integrated custom circuit. The −5 volts is established with respect to the neutral L2 line.

The power supply is a charge pump with positive voltages of line L1 with respect to L2 causing a current flow through diode 335 and negative voltages causing a current flow from the anode of diode 334 to its cathode, thus allowing a negative voltage to be generated at the anode of zener 332.

If the power supply is operating properly, an RC oscillator, constituted of resistors 368 and 369, capacitor 369C and inverters 344, 345 and 346 starts oscillating at 64 KHz. Different frequencies could be obtained by varying the RC time constant. The oscillator output of inverter 344 feeds cascaded counters CTR210, CTR211 and CTR212. They respectively divide the frequency by 16, 512 and 1024. The output of CTR212 at Q11 is thus 7.8 HZ. Inverter 344 also feeds, through gates, counters CTR214, 215, 216 and 217.

Following is a description of the operation of the apparatus shown in FIG. 11.

Power-up Reset, Diagnostic Self-test

When the apparatus is initially turned on, the power-up reset circuit 343 resets counters CTR210, CTR211, and the Power-up Latch 342. The Q bar output of the Power-up Latch 342 goes high, and OR gates 236 and 238 reset flip-flops FF202 and FF203. The Q bar output of flip-flop FF203, via OR gate 253, resets FF206 and the Q bar output of flip-flop FF206 resets flip-flop FF205. Inverter 249 and AND gate 247 form a rising edge pulse generator which is triggered when FF203 is reset. The pulse resets CTR213 via OR gate 340. This enables the beeper output driver circuit, formed by gates 348, 349 and 350, via NOR gate 347. Counter CTR213 is clocked by the Q9 output of counter CTR211 through NOR gate 341. After eight (8) clock pulses, the Q4 output of counter CTR213 goes high and stops further clock input to CTR213 and also disables the beeper output via NOR gate 347. Whenever the apparatus changes state, (i.e. from AUTO to BREW, from BREW to WARM, etc), the beeper output is enabled by a rising edge pulse by the change in state of flip-flops FF202, 203 and 205 and the output of OR gate 340 to the R input of counter CTR213. The beeper output frequency and the length of the beep time are determined by the system clock oscillator frequency and the number of divider stages in counters CTR210 and CTR211.

If the system clock oscillator, is operational, and the system clock dividers CTR210 and CTR211 are counting properly, the Q9 output of counter CTR211 will set the power-up latch 342, and its Q bar output will go low, thus allowing master reset OR gate 236 to go low and reset flip-flop FF203 and permit the state controller to operate starting with state A or OFF.

OFF State (A):

In state A or OFF, the condition of the state controller equivalent of FIG. 5 in the detailed implementation of FIG. 11 can be described as follows: Light Emitting Indicators (LED) AUTO 224, ON 226, BREW 230 and WARM 232 are off. LED indicator CLEAN 228 can either be Off or On depending on the test conditions and results of the previous BREW cycle. Control flip-flops FF202, FF203, FF205 and FF206 are reset to Off, thus the Q output of FF206 is low and turns off AND gate 283, causing triac drive Q 284 and triac TRC 288 to be disabled. The Q bar output of ON flip-flop FF203 resets thermal shut-off latch FF207 and auto-shut off counter/timer CTR217.

Also the Q bar output of the BREW/WARM flip-flop FF205 resets the thermistor check timer CTR216 via OR gate 338 and resets the clean light timer CTR212 with the output of OR gate 339.

Only the push button PB 371 input can cause the state controller to change state in this condition. The PB input is usually in a high condition since resistor R372 is connected to +V. When the PB input is connected to ground by the operator pressing PB, the input goes low and inverter 235 changes the data (D) input of flip-flop FF201 from low to high. The clock (C) input of flip-flop FF201 is connected to the Q7 output of counter CTR211.

The frequency of output Q7 of counter CTR211 is approximately 30 hertz with a period of about 32 milliseconds. The data at flip-flop FF201 can only be clocked at this slow rate allowing transients and contact bounce noise generated by PB to be rejected by the input. When the PB input has been closed during a low to high clock transition, the Q output of flip-flop FF201 will go high for a minimum of 32 milliseconds and will cause the state controller to change from state A (OFF)

to state B (AUTO) or state C (BREW) depending on the selected state of the mode-select input (MSI) 306.

AUTO State (B), MSI (Mode Select Input) Low

The MSI input 306 is pulled high by a resistor R370 or a current source. If a jumper connects the MSI input to ground, the low level at the input will cause the state controller to change from the OFF state (A) to the AUTO state (B) when PB 371 is pressed. If Mode Select input 306 is low, OR gate 238 will be low. Since control flip-flops FF202 and FF203 are reset in OFF state (A), OR gate 239 is Off inhibiting FF203 from turning On with the next push button (PB) input impulse. The output of AND gate 237 is high since the Q bar output of flip-flops FF202 and FF203 are high. Thus a push-button input impulse will set flip-flop FF202 to On which in turn lights the AUTO light LED 224 and enables the Auto-Start Input (ASI) 305 via AND gate 233. The state controller will next change from the AUTO state (B) to the BREW state (C) whenever either the auto-start input is pulled low or the push button (PB) input is pulled low.

AUTO State B, Push-button Change

When the apparatus is in AUTO state (B), OR gate 239 is On which in turn enables AND gate 242. XOR gate 243 is on since the Q output of flip-flop FF203 is low and the Q bar of flip-flop FF205 is high. Also AND gate 242 is high to the data (D) input of flip-flop FF203. A push-button (PB) pulse input in these conditions will turn on flip-flop FF203 causing the Q output of flip-flop FF203 to go high and reset flip-flop FF202 via OR gate 238. This sequence initiates the BREW state (C) described in detail below.

AUTO State (B), Auto-start Input Change

When in the AUTO state (B), if the auto-start input (ASI) 305 is pulled low, inverter 221 and NOR gate 222 generate a pulse which sets flip-flop FF203 on. The Q output of flip-flop FF203 thus goes high, resetting flip-flop FF202 via OR gate 238 as before, and the BREW state (C) is initiated.

OFF State (A), Push-button Input Change with MSI High

When the mode select input 306 is high, it locks flip-flop FF203 in a reset condition via OR gate 238. If flip-flop FF203 is reset and flip-flop FF205 is reset, then XOR gate 243 is high. AND gate 242, which is enabled by OR gate 239 and XOR gate 243, sets the data input of flip-flop FF203 high. This means that the state controller, when PB is pressed with the apparatus in the OFF state, will not change to the AUTO state (B), but will change from OFF state (A) to the BREW state (C).

BREW State (C)

In the above conditions, when the push-button input PB is low, the Q output of flip-flop FF201 goes high and flip-flop FF203 is set. The Q output of flip-flop FF203 goes high and causes the rising edge pulse generator, consisting of inverter 240 and AND gate 241, to send a pulse to the following circuits: OR gate 340 which initiates a beeper cycle via counter CTR213 as previously described; CLEAN light flip-flop FF204; clock input (C) to reset flip-flop FF204 and turn off the CLEAN light LED 228 if it had been set on during the previous BREW cycle; the set (S) input of flip-flop FF205, thus setting it to On causing the BREW (C) state to be initiated; the set (S) input of power control flip-flop FF206 via OR gate 256 and AND gate 254 which set flip-flop FF206 to On enabling the triac output driver 284. Thus a change from state A to state C causes the beeper to sound for about one second, the "ON" light LED 226 to turn On, the BREW light LED 230 to turn On and full power (100%) to be selected. The triac driver is also enabled, and the CLEAN light (LED 228) is turned off if it was on from a previous cycle.

BREW State (C), Thermistor Check Timer Operation

When the BREW cycle begins, flip-flop FF205 is set On and the Q bar output of FF205 is low. The thermistor (TH) 264 is in physical contact with the water tube and heating unit, and measures the temperature T of said heating unit. The thermistor resistance decreases as the measured temperature increases. The voltage at the T node decreases as the measured temperature increases. Resistors R260, R261, R262, R263 form a divider network which sets three reference voltages which correspond to the control temperatures measured by TH. These temperatures can be adjusted by changing the values of resistors R260, R261, R262, R263, and are referred to as $T_{TAT}$ (approximately 80° C.), $T_{LO}$ (approximately 140° C.), and $T_{HI}$ (approximately 170° C.). Resistor R265 and thermistor TH 264 form a divider bridge which is connected in parallel and across the reference divider bridge comprised of resistors R260 through R263 to create a differential measurement bridge which will give a consistent comparison regardless of the voltage level supplying the bridge. When the measured temperature T, is below $T_{TAT}$, the output of comparator CMP259 is low. When the measured temperature T, is above $T_{TAT}$, the output of comparator CMP259 is high. Assuming the initial measured temperature T, is room ambient (approximately 23° C.), then the output of comparator CMP259 will be low. Since comparator CMP259 is low and the Q bar output of flip-flop FF205 is low, then the output of OR gate 338 will be low allowing counter CTR216 to begin counting. As the measured temperature T rises above $T_{TAT}$ (80° C.), comparator CMP259 will switch from low to high which will reset counter CTR216. Counter CTR216 is also held in reset, regardless of temperature, if the controller is not in the BREW state (C). If the measured temperature T does not rise above $T_{TAT}$ before counter CTR216 has counted 512 system clock pulses (approximately 1 minute), then the Q10 output of counter CTR216 will go high and through OR gate 360 and master reset OR gate 236 will reset the state controller to the OFF state (A). This situation can occur if one or more of the following conditions are present: a thermistor wire is broken; a thermal fuse is open; the heater element is open; the power triac is open; the receiving vessel detector is open, or any other condition which prevents the heating unit from operating. If the controller fails to sense the necessary increase in measured temperature T it will shut the machine to the OFF state (A). This safety feature is essential for negative temperature coefficient type of thermistors.

BREW State (C), Clean Light Operation

During the brewing period, the water in the heating unit keeps the water tube at a specific temperature. As mineral deposits accumulate on the inside of the water tube, the water tube temperature increases since the scale lining inside the water tube decreases the heat transfer from the heating unit to the water in the water tube. When the measured temperature T exceeds $T_{LO}$ during the brewing period, the output of comparator CMP258 goes low. Flip-flop FF205 is low during the BREW period and comparator CMP258 causes OR gate 339 to go low, enabling clean light counter/timer CTR212 which begins counting. If the BREW state (C) ends before counter CTR212 is finished counting, then the Q bar output of flip-flop FF205 will go high, resetting counter CTR212 via OR gate 339 and the clean light will not be activated. If counter CTR212 reaches a full count before the BREW cycle ends, then the output Q11 of CTR212 will go high and set flip-flop FF204 on and turn on clean light LED 228 via output buffer 207. When flip-flop FF204 is set, its Q bar output goes low and prevents any reset input by flip-flop FF205 from turning the clean light LED 228 off. As indicated earlier, the clean light flip-flop FF204 is reset at the beginning of each BREW cycle by a pulse generator consisting of inverter 240 and AND gate 241, when flip-flop FF203 is set on. If the clean light flip-flop FF204 is off and state control flip-flop FF205 is not in the BREW (ON) condition, the Q bar output of FF205 is high and holds clean light flip-flop FF204 off, clean light LD 228 off and resets counter CTR212.

BREW State (C), Full Power Triac Operation

With the apparatus in the BREW state, the triac output circuits are controlled by power flip-flop FF206 and flip-flop FF205. In the BREW state (C), flip-flop FF205 is set, with its Q output high, and if T is less than $T_{HI}$, flip-flop FF206 is set via a pulse from inverter 240, AND gate 241, OR gate 256 and AND gate 254. The Q output of flip-flop FF205 which is high, is connected to inverter 275, AND gate 276 and AND gate 277. AND gate 277 is thus enabled permitting the output of the zero crossing delay counter, CTR214, to trigger the output pulse counter CTR215. Resistor R298 connects one side of the A.C. line to the input of the zero crossing detector made up of inverter 295, delay buffer 294, and XOR gate 293. When the line voltage crosses zero with respect to the LINE IN input, XOR gate 293 generates a positive pulse whose length is equal to the time of the delay buffer 294. This pulse resets counter CTR214 causing Q7 to go low. Q7 disables the triac driver output Q284 via AND gate 283 and discharges the phase delay capacitor C267 via inverter 273 and semiconductor Q268 (the phase delay capacitor is utilized in the operation of the WARM state). OR gate 292 is also enabled and counter CTR214 starts counting the 64 KHz system clock. Also, the output of AND gate 277 goes low. When counter CTR214 has counted 40 clock cycles, its Q7 output goes high. This enables triac driver output Q284 via AND gate 283 and turns off Q268 via inverter 273, allowing capacitor C267 to begin charging. It also disables OR gate 292, stopping counter CTR214, and causes AND gate 277 to go high, causing OR gate 278 to go high. A rising edge pulse generator formed by AND gate 280 and delay inverter 279, resets CTR215 just after the system clock's signals rising edge. The Q2 output of counter CTR215 goes low, turning on triac driver Q284 via inverter 282 and AND gate 283. Q2 also enables OR gate 281. After two system clock cycles, the Q2 output of counter CTR215 goes high and turns off triac driver Q284 via inverter 282 and AND gate 283. It also disables OR gate 281, stopping counter CTR215 until the next reset pulse from AND gate 280. This circuitry allows triac TRC288 to be fired approximately 600 microseconds after every zero A.C. line crossing, and reduces the operating supply current by limiting the triac's firing pulse width to 32 microseconds. This also minimizes heat dissipation in the triac gate. The triac effectively fires continuously, supplying full power to the heater assembly. When T is greater than $T_{HI}$, due to lack of water in the heater unit at the end of the BREW cycle, then comparator CMP257 will go high and reset FF206 via OR gate 253. The Q bar output of flip-flop FF206 goes high and resets flip-flop FF205. FF205 is now in the WARM (D) state, and the Q output of FF206 is low, which disables the triac driver Q284 via AND gate 255 and AND gate 283 turning all power to the heater off.

WARM State (D), Phase Delay Triac Power Control

When flip-flop FF205 is reset, its Q output is low and the BREW light LED 230 turns off. Also the WARM light LED 232 is turned on while the ON light LED 226 remains on. AND gate 277 is disabled by the Q output of flip-flop FF205 and AND gate 276 is enabled through inverter 275. The triac firing is now controlled by the phase delay timing circuit which consists of comparator CMP272, AND gate 274, inverter 273 and output driver Q268. When the A.C. line zero crossing detector senses a zero volt line crossing, counter CTR214 is reset as described above and the Q7 output of counter CTR214 goes low for approximately 600 microseconds. During this time, the triac output driver Q284 is disabled via AND gate 283 which is connected to the Q7 output of counter CTR214. AND gate 274 is connected to counter CTR214 output Q7 which disables any output from comparator CMP272. Inverter 273 is connected to counter CTR214 output Q7 which turns output driver Q268 on, thus discharging the phase delay timing capacitator C267. When capacitor C267 is discharged, the voltage at node TC IN is near zero and therefore the output of comparator CMP272 is low. When counter CTR214 reaches the full count, its Q7 output goes high causing inverter 273 to turn off output driver Q268, thus allowing timing capacitor C267 to begin charging through resistor R266. AND gates 274 and 283 are also enabled. Resistors R270, R269, and R271 form an adjustable reference bridge. The reference voltage can be raised or lowered by rotating control R271. When R271 is rotated fully clock-wise, Vref is at its lowest value which allows for the earliest phase firing of the triac TRC288 and the highest level of keepwarm wattage. This sets Vref at the input of comparator CMP272. When the voltage on capacitor C267 goes above Vref, the output of comparator CMP272 goes high, AND gate 274 goes high, AND gate 276 goes high, OR gate 278 goes high and the triac pulse is generated as previously described. Thus the triac fires in a phase delayed manner due to the charging of C267 and therefore reduces the wattage available to the heating unit to keep the beverage in the vessel warm. The wattage range can be changed by changing resistors R269 and R270. The configuration, shown in FIG. 11 provides for approximately 0 to 10% of the full power wattage.

During the WARM cycle, if temperature T becomes greater than $T_{HI}$, the output of comparator CMP257 goes high and FF206 is reset via OR gate 253. This disables triac driver Q284 since the Q output of FF206 is low, AND gate 255 goes low and AND gate 283 goes low, turning triac driver Q284 off. With power off, the temperature starts decreasing and when temperature T goes below $T_{LO}$, comparator CMP258 goes high causing OR gate 256 to go high and flip-flop FF206 to be set. The Q output of flip-flop FF206 goes high causing AND gate 255 to go high and AND gate 283 is enabled. Phase delayed firing pulses are sent to the triac TRC288 via output driver Q284. The heating unit operates again with reduced warming wattage to maintain beverage temperature in the receiving vessel.

WARM State (D), Automatic Thermal Shut-off

When in the WARM state (D), flip-flop FF205 is reset and its Q bar output is high. When changing from the BREW state (C) to the WARM state (D), flip-flop FF206 is reset and its Q bar output is high. To prevent thermal shut-off flip-flop FF207 from turning on during the BREW or WARM transition, flip-flop FF206 is reset before flip-flop FF205 and low data are clocked by flip-flop FF207, and its Q1 output remains low. When the temperature T goes lower than $T_{LO}$, the output of comparator CMP258 goes high, setting flip-flop FF206 causing its Q bar output to be low. If T should go above $T_{HI}$ for a second time while in the WARM state (D), the output of comparator CMP257 goes high, resetting flip-flop FF206 via OR gate 253. Since flip-flop FF205 is already reset and its Q bar output is high; when the Q bar output of FF206 goes high, it sets flip-flop FF207, causing its Q1 output to go high. If the thermal shut-off input 307 is not connected to ground, the internal pull-up resistor 364 will enable AND gate 261. When flip-flop FF207 goes high, AND gate 261 goes high, causing master reset OR gate 236 to reset the state machine controller to the OFF state (A).

If the thermal shut-off input is connected to ground, then any output from flip-flop FF207 is ignored and the controller will not be reset to the OFF state (A). Flip-flop FF206 will toggle off when the temperature T rises above $T_{HI}$ and will toggle on when the temperature T falls below $T_{LO}$, thus maintaining a suitable control temperature limit.

WARM State (D), Automatic Time Shut-off

When the controller is in either BREW state (C) or in WARM state (D), counter CTR217 is enabled when its reset input goes low. CTR217 is connected to flip-flop FF203 whose Q bar output is low whenever the controller is in the BREW or WARM state. Counter CTR217 has four outputs which correspond to four shut-off times. Each shut-off time is two times longer than the preceding time, i.e. approximately 35, 70, 140 and 280 minutes. To select the proper time, decoder select logic is used so that two input pins can select the four times. The decoder select logic consists of inverters 362 and 363, AND gates 359, 351, 358, 352, 357, 353, 356 and 354 and OR gate 355. If Select Input Pins A and B are low, then inverters 363 and 362, and AND gates 359, 358, 357 and 356, decode the binary 00 code so that the output of AND gate 359 is high. This enables AND gate 359 to select counter CTR217's Q15 output via AND gate 351 and OR gate 355. When counter CTR217 reaches the proper count, Q15 goes high, AND gate 351 goes high, OR gate 355 goes high, OR gate 360 goes high and master reset OR gate 236 goes high, resetting the controller to the OFF state (A). The same scenario occurs for the other binary selections: if A=1 and B=0, this combination selects AND gates 358 and 352 for a shut-off time of 70 minutes; if A=0 and B=1, the combination selects AND gates 357 and 353 for a shut-off time of 140 minutes; and if A=1 and B=1, the combination selects AND gates 356 and 354 for 280 minutes.

Beverage Vessel Detection and Triac Power Control

A means to control the triac is provided so that when the beverage vessel or decanter is removed from the heating means, the triac is disabled and powder for the heating unit is turned off. Several methods could be used to accomplish this. Switch 286 could be a reed switch as shown in FIGS. 9A to 9C. In another embodiment a mechanical switch 286 is connected between the triac driver output pin and the junction of the triac TRC288 gate and resistor R287. If the switch is mechanically connected so that it is closed when the beverage vessel is placed on the heating unit, the triac will operate normally as previously described. If the beverage vessel is removed, or improperly placed on the heating unit, then the switch will be open and the triac will remain off regardless of the state of the controller. A further method to accomplish the beverage vessel detection comprises the detection switch being connected to a fourth input of AND gate 283. The fourth input to this gate is connected to ground via a pull-down resistor and the switch. The switch is closed when the beverage vessel is in the correct position. AND gate 283 would become disabled whenever the beverage vessel is missing or incorrectly placed on the heating unit. With the vessel missing the fourth input to AND gate 283 goes low and disables triac output driver Q284, leaving triac TRC288 off. Therefore no power would be supplied to the heating unit.

Thermal fuses 289 and 291 are added as a precaution in case of a system failure resulting in the heating unit 290 becoming excessively hot.

A large family of simpler apparatus relying on only a portion of the features contained in the invention will be obvious to those skilled in the art.

The invention has been described in such terms as to enable a person skilled in the art to practice the invention, but variations and modifications within the spirit and scope of the invention falling within the scope of the claims may occur to those skilled in the art to which the invention pertains.

What is claimed is:

1. Apparatus for heating water for infusing coffee or the like, said apparatus comprising:
   heating means supplied by an A.C. power source;
   power control means for connecting said A.C. power source to said heating means;
   high power means for causing said power control means to apply full A.C. power to said heating means when a high power is required for the operation of said apparatus;
   low power means for causing said power control means to apply a portion of subsequent AC cycles to said heating means when a lower power is required, said low power means comprising phase delay means for limiting the application of A.C. power to the portion of subsequent A.C. cycles; and
   said power control means including triac means for receiving a control signal from either the high power means or the low power means for applying A.C. power from an A.C. power source to said heater means; and
   trigger means having inputs operatively connected to said high power means and to said low power means and whose output is operatively connected to the gate of said triac means, said trigger means generating a current spike for enabling said triac means during each half of an A.C. voltage cycle.

2. Apparatus according to claim 1 wherein said trigger means generates a negative current spike for enabling said triac means during each half of an A.C. voltage cycle.

3. Apparatus according to claim 2 and further comprising zero crossing detection means for detecting each sign change of the A.C. voltage line and operatively connected to said high power means and to said low power means; and trigger delay means included in said high power means and responsive to the output of said zero crossing detecting means for activating the trigger means with an adequate delay after each zero crossing to allow sufficient A.C. voltage to be applied across the triac to allow a stable activation of said triac.

4. Apparatus according to claim 2 and further comprising:

zero crossing detection means for detecting each sign change of the A.C. voltage line and operatively connected to said high power means and to said low power means; and phase delay means included in said low power means and responsive to the output of said zero crossing detection means for delaying the activation of said trigger means to enable said triac to the latter half of each half of the A.C. voltage cycles.

5. Apparatus according to claim 4 further comprising user actuable phase adjustment means operatively connected to said phase delay means for continuously adjusting within a predetermined range the amount of delay to vary the heating means temperature.

6. Apparatus according to claim 5 wherein said phase delay means comprises:

resistor means and capacitor means operatively connected to each other for establishing a first variable voltage, said voltage being representative of the time elapsed after the detection of an A.C. line zero voltage crossing by said zero crossing detection means;

reference voltage continuously adjustable within a predetermined range, said reference voltage being representative of the phase delay required; and phase voltage comparator means having an output activated when said first variable voltage crosses the value of said reference voltage, said output being operatively connected to said trigger means.

7. Apparatus for monitoring the temperature of heating means in an electric coffee maker or the like, said apparatus comprising temperature sensor means operatively connected to said heating means;

temperature comparator means connected to the output of said temperature sensor means, said temperature comparator means providing at least one output when the temperature sensed by the temperature sensor means passes a first higher pre-established temperature threshold and a second output when the temperature sensed by the temperature sensor means passes a second, relatively lower pre-established temperature threshold; and state control means for controlling the operational sequence of said coffee maker, said state control means having at least two operative inputs and generating output signals for controlling the logical operational sequence of said coffee maker, the output of said temperature comparator means controlling the operation of said state control means.

8. Apparatus according to claim 7 wherein said temperature comparator means provides a third output when the temperature sensed by said temperature sensor means passes a third pre-established temperature threshold, said third threshold being intermediate to said first and second temperature thresholds.

9. Apparatus according to claim 8 wherein said temperature sensor means is a thermistor.

10. Apparatus according to claim 9 wherein said temperature comparator means comprises a differential, parallel resistor ladder network:

a first network consisting of resistors connected in series and supplied by a D.C. voltage to establish at the junction of said resistors reference voltages corresponding to said pre-established temperature thresholds, a second network consisting of a resistor and the thermistor connected in series and supplied by the same D.C. voltage, the voltage at the junction of said resistor and said thermistor corresponding to the temperature sensed by the thermistor;

at least two voltage comparator means having each two inputs and one output with one of the inputs of each voltage comparator means connected to a corresponding junction of said first network and with the other input of each comparator means connected to the junction of said second network, wherein a change in sign of the output of a voltage comparator means is reflective of the crossing of the temperature sensed by the thermistor of the corresponding temperature threshold, to control the operational sequence of said state control means.

11. Apparatus according to claim 8 and further including trigger means having inputs operatively connected to said high power means and low power means, and whose output is operatively connected to the gate of said triac, said trigger means generating a current spike for enabling said triac during each half of an A.C. voltage cycle.

12. Apparatus according to claim 11 and further including trigger means having inputs operatively connected to said high and low power means, and an output operatively connected to the gate of said triac, said trigger means generating a negative current spike for enabling said, triac during each half of an A.C. voltage cycle.

13. Apparatus according to claim 12 and further comprising:

zero crossing detection means for detecting each sign change of the A.C. voltage line and operatively connected to said high power means and to said low power means; and trigger delay means included in said high power means and responsive to the output of said zero crossing detection means for activating the trigger means with an adequate delay after each zero crossing to allow sufficient A.C. voltage to be applied across the triac to allow a stable activation of said triac.

14. Apparatus according to claim 12 and further comprising:

zero crossing detection means for detecting each sign change of the A.C. voltage line and operatively connected to said high power means and to said low power means; and phase delay means included in said low power means and responsive to the output of said zero crossing detection means for delaying the activation of said trigger means to enable said triac to the latter half of each half of the A.C. voltage cycle.

15. Apparatus according to claim 14 further comprising user actuable phase adjustment means operatively connected to said phase delay means for continuously adjusting within a predetermined range the amount of delay to vary the heating means temperature.

16. Apparatus according to claim 15 wherein said phase delay means comprises:

resistor means and capacitor means operatively connected to each other for establishing a first variable voltage, said voltage being representative of the time elapsed after the detection of an A.C. line zero voltage crossing by said zero crossing detection means;

reference voltage means for establishing a reference voltage continuously adjustable within a predetermined range, said reference voltage being representative of the phase delay required; and phase voltage comparator means having an output activated when said first variable voltage crosses the value of said reference voltage, said output being operatively connected to said trigger means.

17. Apparatus for heating a liquid for infusing coffee or the like, said apparatus having a BREW state during which hot water is infused over coffee or the like to brew a hot beverage and a WARM state to maintain the hot beverage at a desired drinking temperature, said apparatus comprising:

heating means for being power by an A.C. power source;

power control means for connecting said A.C. power source to said heating means;

high power means for causing said power control means to apply relatively full A.C. power to said heating means during the BREW state;

low power means for causing said power control means to apply a portion of subsequent A.C. cycles to said heating means during the WARM state;

temperature sensor means operatively connected to said heating means for continuously monitoring the temperature of said heating means;

temperature comparator means connected to the output of said temperature sensor means, said temperature comparator means providing at least one output when the temperature sensed by the temperature sensor means passes a first higher pre-established temperature and a second output when the temperature sensed by the temperature sensor means passes a second relatively lower pre-established temperature threshold, and state control means responsive to the outputs of said temperature comparator means for controlling the status of the apparatus between a BREW state and a WARM state, said state control means activating the high power means during the BREW state and the low power means during the WARM state.

18. Apparatus according to claim 17 wherein said power control means is an electronic switch.

19. Apparatus according to claim 18 wherein said power control means is a triac.

20. Apparatus according to claim 19 wherein said temperature sensor means is a thermistor.

21. Apparatus according to claim 17 wherein said low power means comprise phase delay means limiting the application of A.C. power to a portion of subsequent A.C. cycles.

22. Apparatus according to claim 21 wherein said temperature comparator means provides a third output when the temperature sensed by said temperature sensor means passes a third pre-established temperature threshold, said third threshold being intermediate to said first and second temperature thresholds.

23. Apparatus according to claim 21 wherein said temperature comparator means comprises differential, parallel resistor ladder networks, said networks comprising:

a first network including resistor means connected in series and supplied by a D.C. voltage to establish at the junction of said resistor means reference voltages corresponding respectively to said pre-established temperature thresholds;

a second network including resistor means and the thermistor connected in series and supplied by the same D.C. voltage as the first network, the voltage at the junction of said resistor means and said thermistor corresponding to the temperature sensed by the thermistor at the heating means;

and wherein at least two voltage comparator means having each two inputs and one output with one of the inputs of each voltage comparator connected to a corresponding junction of said first network and with the other input of each comparator means connected to the junction of said second network, wherein a change in sign of the output of a voltage comparator is reflective of the crossing of the temperature sensed by the thermistor of the corresponding temperature threshold to control the operational sequence of the state control means.

24. Apparatus according to claim 23 wherein said temperature comparator means includes a first voltage comparator means having an output when the temperature sensor means crosses a first lower pre-established temperature ($T_{TAT}$);

a second voltage comparator means having an output when the temperature sensor means crosses a second intermediate pre-established temperature ($T_{LO}$); and a third voltage comparator means having an output when the temperature sensor means crosses a third higher pre-established temperature ($T_{HI}$).

25. Apparatus according to claim 24 wherein the BREW state and the WARM state of said apparatus are included in the state control means, and wherein said state control further includes an OFF state and an ON state, and said apparatus further includes:

temperature sensor timer means operatively connected to said state control means and to said first voltage comparator means, said temperature sensor timer means being activated by the initiation of the BREW state of the state control means for causing the state control means to change to the OFF state after a predetermined period of time in the absence of an output by said first voltage comparator means within said predetermined period of time.

26. Apparatus according to claim 24 wherein the BREW state and the WARM state of said apparatus are included in the state control means, and wherein said state control further includes an OFF state and an ON state and said apparatus further includes:

clean indicator means for indicating the formation of water deposits in the heating means;

indicator drive means for activating said clean indicator means, said indicator drive means being operatively connected to said state control means;

clean timer means activated, during the BREW state, by second voltage comparator means output when the temperature sensed by temperature sensor means exceeds the pre-established intermediate temperature $T_{LO}$, said clean timer means activating said state control means for activating said indicator drive means and clean indicator means after a predetermined time period in the absence of an output by third voltage comparator means during said predetermined time period.

27. Apparatus according to claim 26 wherein the output of said second voltage comparator means and the predetermined time period of said clean timer means are set according to the temperature $(T_{LO})$-time characteristics consistent with the formation of excessive water deposit built up in said heating means.

28. Apparatus according to claim 24 wherein the BREW state and the WARM state of said apparatus are included in the state control means, and wherein said state control means further includes an ON state and an OFF state and wherein said state control is further operatively connected to the output of said third voltage comparator means, said state control means changing from its BREW state to the WARM state in response to a first in time output by said third voltage comparator means.

29. Apparatus according to claim 28 wherein the state control means, in response to its change in state from the BREW state to the WARM state further deactivates the high power means.

30. Apparatus according to claim 29 wherein said low power means are activated by said state control means, said state controller means being responsive to an output, during the WARM state, of said second voltage comparator means.

31. Apparatus according to claim 30 wherein said apparatus further includes thermal shut-off means, said thermal shut-off means being operatively connected to said state control means, for changing the state of said state control means from the WARM state to the OFF state in response to an output of said third voltage comparator means.

32. Apparatus according to claim 31 said apparatus further including thermal shut-off activator means for enabling or disabling the operation of said thermal shut-off means.

33. Apparatus according to claim 30 wherein said apparatus further includes:

auto shut-off timer means for changing the state of the state control means from the WARM state to the OFF state after a preselected time period;

auto shut-off timer selector means for varying the length of the preselected time period;

said auto shut off timer means being activated by an output of the state control means at the initialization of the BREW state, and said auto shut-off means having an output operatively connected to said state control means for changing the state of said state control means from the BREW state or the WARM state to the OFF state when said output of said auto shut-off means becomes active after a preselected time period.

34. Apparatus according to claim 25 wherein said apparatus further comprises change of state indicator means operatively connected to said state control means for indicating each change of state of said state control means.

35. Apparatus according to claim 34 wherein said change of state indicator means is a piezoelectric beeper.

36. Apparatus for heating water for infusing coffee or the like, said apparatus being connected to an electrical power source and having at least two electrically operated components, said apparatus having:

state control means having at least two inputs and at least one output for controlling the sequential operation of said apparatus, said state control means having at least two control states for controlling the respective components;

user means for a user to actuate at least one input to select the state of said state control means;

indicator means for indicating the state of said apparatus;

indicator drive means operatively connected to said state control means for activating said indicator means;

heating means supplied by an electrical power source for heating water at a high power level in the BREW state or at a relatively lower power level in the WARM state;

power control means operatively connected to said heating means for connecting the electrical power source to said heating means;

high power means for causing said power control means to apply relatively full electrical power to said heating means when the BREW state is active;

low power means for causing said power control means to apply a portion of the electrical power to said heating means when the WARM state is active;

temperature sensor means operatively connected to said heating means for monitoring the temperature of said heating means;

temperature comparator means operatively connected to said temperature sensor means for providing a first output to said state control means when the temperature sensed by the temperature sensor means exceeds a first pre-established temperature threshold, a second output when the temperature sensed by the temperature sensor means exceeds a second pre-established temperature threshold, and a third output when the temperature sensed by said temperature sensor means goes below a third pre-established temperature threshold intermediate to the first and second temperature thresholds;

said state control means changing from its BREW state to its WARM state in response to the first time a second output is received from the temperature comparator means and deactivating said power control means;

said state control means activating said power control means when said temperature comparator means detects a temperature sensed by said temperature sensor means going below the third pre-established temperature threshold;

temperature sensor timer means operatively connected to said state control means and to the first output of said temperature comparator means, said temperature sensor timer means being activated by the initiation of the BREW state of the state control means for causing the state control means to change to the OFF state after a first predetermined period of time in the absence of an output by said first output of said temperature comparator means within said first predetermined period of time;

clean timer means activated during the BREW state for a clean time period, by and during the third output of said temperature comparator means when the temperature sensed by the temperature sensor means exceeds the third pre-established temperature threshold, said clean timer means activating said state control means for activating said indicator drive means and clean indicator means, in the absence of a second output from said temperature comparator means during said clean time period;

system clock means for controlling the sequential operation of the components of said apparatus; and power-up reset means for checking the operability of selected components of said apparatus when an A.C. power source is initially supplied to said apparatus, and for disabling said apparatus when one of said selected components is not operating properly.

37. Apparatus according to claim 36 and further including manually operable means operatively connected to said state control means for a user to override the state of said state controller and to implement a different state.

38. Apparatus according to claim 36 and further including automatic shut-off timer means operatively connected to said state control means for changing the state of said state control means from the BREW state or the WARM state to the OFF state after a predetermined period of time.

39. Apparatus according to claim 36 and further including means for holding a vessel for receiving liquid from said apparatus, and vessel detector means for preventing power from energizing said heating means when no vessel is held by said vessel holding means.

40. Apparatus according to claim 36 wherein said state control means further includes an AUTO state.

41. Apparatus according to claim 36 and further including input means operatively connected to external control means to change the state controller means to implement a different state.

42. Apparatus according to claim 36 and further including latched cleaning indicator means, said latched means being latched in response to an output of said clean timer means, said latched means being unlatched by the deactivation of said power source or the change of state of said state control means to the BREW state.

43. Apparatus according to claim 36 wherein said power source reset means further sets the apparatus to the OFF state when said power source means would cause the operating voltage of said apparatus to go below a pre-determined low level.

44. Apparatus according to claim 36 and further including automatic shut-off timer means operatively connected to said state control means for changing the state of said state control means from the BREW state to the OFF state after a pre-determined period of time.

45. Apparatus according to claim 36 and further including means for receiving cleaning liquid, and adjusting means for adjusting the low power means to supply adequate electrical power to clean the apparatus.

46. Apparatus according to claim 45 and further including thermal shut-off means to set the state controller to the OFF state when all of the cleaning liquid has been discharged.

47. Apparatus according to claim 1 and further including means for holding a vessel for receiving liquid from said apparatus, and reset detector means for preventing said power control means from supplying A.C. power to said heating means when no vessel is detected in the vessel holding means.

48. Apparatus according to claim 47, wherein said vessel detector means includes magnetic switch means having open and closed states, said magnetic switch means enabling said power control means to operate when said switch means is in the closed state, and said vessel detector means further includes magnetic means for rendering said magnetic switch means in the closed state when a vessel is on said vessel holding means; and wherein said magnetic switch means enters the open state when no vessel is on said vessel holding means.

49. Apparatus for heating a liquid for infusing coffee or the like, said apparatus having a BREW state during which hot water is infused over coffee or the like to brew a hot beverage and a WARM state to maintain the hot beverage at a desired drinking temperature, said apparatus comprising:

heating means being powered by an A.C. power source;

power control means for connecting said A.C. power source to said heating means;

high power means for causing said power control means to apply full A.C. power to said heating means during the BREW state and low power means for causing said power control means to apply partial power to said heating means during the WARM state;

temperature sensor means operatively connected to said heating means for continuously monitoring the temperature of said heating means;

temperature comparator means connected to the output of said temperature sensor means, said temperature comparator means providing at least one output when the temperature sensed by the temperature sensor means exceeds a temperature $T_{HI}$ and a second output when the temperature sensed by the temperature sensor means goes below a temperature $T_{LO}$; and state control means responsive to the outputs of said temperature comparator means for controlling the status of the apparatus between a BREW state and a WARM state;

wherein said temperature comparator means comprises differential, parallel resistor ladder networks, said networks comprising:

a first network including resistor means connected in series and supplied by a D.C. voltage to establish at the junction of said resistor means reference voltages corresponding respectively to said pre-established temperatures $T_{LO}$ and $T_{HI}$;

a second network including resistor means and thermistor means connected in series and supplied by the same D.C. voltage as the first network, the voltage at the junction of said resistor means and said thermistor means corresponding to the temperature sensed by the thermistor means at the heating means; and and wherein at least two voltage comparator means, each having two inputs and one output, with one of the inputs of each voltage comparator connected to a corresponding junction of said first network, and with the other input of each comparator means connected to the junction of said second network, wherein a change in sign of the output of a voltage comparator is reflective of the crossing of the temperature sensed by the thermistor means of the corresponding temperature $T_{LO}$ or $T_{HI}$ to control the operational sequence of the state control means.

50. Apparatus for heating a liquid for infusing coffee or the like, said apparatus having a BREW state during which hot water is infused over coffee or the like to brew a hot beverage and a WARM state to maintain the hot beverage at a desired drinking temperature, said apparatus comprising:

heating means being powered by an A.C. power source;

power control means for connecting said A.C. power source to said heating means;

power means for causing said power control means to apply full A.C. power to said heating means during the BREW state and for causing said power control means to apply partial power to said heating means during the WARM state;

temperature sensor means operatively connected to said heating means for continuously monitoring the temperature of said heating means;

$T_{HI}$ temperature comparator means connected to the output of said temperature sensor means for generating an output when the temperature sensed by the temperature sensor means exceeds a temperature $T_{HI}$, and $T_{LO}$ temperature comparator means connected to the output of said temperature sensor means for generating an output when the temperature sensed by the temperature sensor means goes below a temperature $T_{LO}$, and state control means responsive to the outputs of said temperature comparator means for controlling the status of the apparatus between a BREW state and a WARM state.

51. Apparatus for heating a liquid for infusing coffee or the like, said apparatus having a BREW state during which hot water is infused over coffee or the like to brew a hot beverage and a WARM state to maintain the hot beverage at a desired drinking temperature, said apparatus comprising:

heating means being powered by an A.C. power source;

power control means for connecting said A.C. power source to said heating means;

power means for causing said power control means to apply full A.C. power to said heating means during the BREW state and for causing said power control means to apply partial power to said heating means during the WARM state;

temperature sensor means operatively connected to said heating means for continuously monitoring the temperature of said heating means;

temperature comparator means connected to the output of said temperature sensor means, said temperature comparator means providing at least one output when the temperature sensed by the temperature sensor means exceeds a temperature $T_{HI}$ and a second output when the temperature sensed by the temperature sensor means goes below a temperature $T_{LO}$;

state control means responsive to the outputs of said temperature comparator means for controlling the status of the apparatus between a BREW state and a WARM state, and between an OFF state and an ON state;

clean indicator means for indicating the formation of mineral deposits in the heating means;

indicator drive means for activating said clean indicator means, said indicator drive means being operatively connected to said state control means; and clean timer means activated, during the BREW state, by said temperature comparator means output when the temperature sensed by temperature sensor means exceeds the temperature $T_{LO}$, said clean timer means activating said state control means for activating said indicator drive means and said clean indicator means after a predetermined time period in the absence of an output by said temperature comparator means when the temperature sensed by said temperature sensor means exceeds the temperature $T_{HI}$ during said predetermined time period.

52. Apparatus according to claim 51 wherein the activated indicator drive means remains activated until said state control means initiates the next BREW state or until the A.C. power source to said apparatus is interrupted.

53. Apparatus for heating a liquid for infusing coffee or the like, said apparatus having a BREW state during which hot water is infused over coffee or the like to brew a hot beverage and a WARM state to maintain the hot beverage at a desired drinking temperature, said apparatus comprising:

heating means being powered by an A.C. power source;

power control means for connecting said A.C. power source to said heating means;

power means for causing said power control means to apply full A.C. power to said heating means during the BREW state and for causing said power control means to apply partial A.C. power to said heating means during the WARM state;

temperature sensor means operatively connected to said heating means for continuously monitoring the temperature of said heating means;

temperature comparator means connected to the output of said temperature sensor means and providing at least one output when the temperature sensed by the temperature sensor means exceeds a temperature $T_{HI}$, and a second output when the temperature sensed by the temperature sensor means goes below a temperature $T_{LO}$; and state control means for setting said power control means to an ON state and to an OFF state, said state control means being responsive to a first-in-time output of said temperature comparator means that the temperature sensed by said temperature sensor means exceeds temperature $T_{HI}$ for changing the status of the apparatus from its BREW state to its WARM state and to set said power control means to the OFF state; and being responsive to a second-in-time output, during the WARM state, of said temperature comparator means when the temperature sensor means goes below the temperature $T_{LO}$ to set said power control means to the ON state, for supplying partial A.C. power to said heating means; and thermal shut-off means operatively connected to said state control means, for changing the state of said state control means from the WARM state to the OFF state in response to a third-in-time output of said temperature comparator means when the temperature sensed by said temperature sensor means exceeds temperature $T_{HI}$.

54. Apparatus according to claim 53 wherein said apparatus further includes thermal shut-off activator means for enabling or disabling the operation of said thermal shut-off means.

55. Apparatus for heating a liquid for infusing coffee or the like, said apparatus having a BREW state during which hot water is infused over coffee or the like to brew a hot beverage and a WARM state to maintain the hot beverage at a desired drinking temperature, said apparatus comprising:

heating means for being powered by an A.C. power source;

power control means for connecting said A.C. power source to said heating means;

high power means for causing said power control means to apply full A.C. power to said heating means during the BREW state;

low power means for causing said power control means to apply partial A.C. power to said heating means during the WARM state;

temperature sensor means operatively connected to said heating means for continuously monitoring the temperature of said heating means;

$T_{HI}$ temperature comparator means connected to the output of said temperature sensor means, said temperature comparator means providing at least one output when the temperature sensed by the temperature sensor means exceeds a temperature $T_{HI}$, and $T_{LO}$ temperature comparator means connected to the output of said temperature sensor means for generating an output when the temperature sensed by the temperature sensor means goes below a pre-established temperature $T_{LO}$;

state control means having a BREW state, a WARM state and an OFF state, said state control means being responsive to a first-in-time output of said temperature comparator means that the temperature sensed by said temperature sensor means exceeds temperature $T_{HI}$ for changing the status of the apparatus from its BREW state to its WARM state, and being responsive to a second-in-time output, during the WARM state, of said temperature comparator means when the temperature sensed by the temperature sensor means goes below temperature $T_{LO}$ to activate said low power means for applying partial A.C. power to said heating means;

thermal shut-off means which are operatively connected to said state control means, for changing the state of said state control means from the WARM state to the OFF state in response to a third-in-time output of said comparator means when the temperature sensed by the temperature sensor means goes below temperature $T_{LO}$;

auto shut-off timer means for changing the state of the state control means from the WARM state or the BREW state to the OFF state after a preselected auto shut-off time period;

auto shut-off timer selector means for varying the length of the preselected auto shut-off time period; and said auto shut-off timer means being activated by an output of the state control means at the initiation of the BREW state.

* * * * *